(12) United States Patent
Rigby

(10) Patent No.: US 11,236,858 B1
(45) Date of Patent: Feb. 1, 2022

(54) STRUT CHANNEL MOUNTING BRACKET

(71) Applicant: Charles E. Rigby, Dawsonville, GA (US)

(72) Inventor: Charles E. Rigby, Dawsonville, GA (US)

( * ) Notice: Subject to any disclaimer, the term of this patent is extended or adjusted under 35 U.S.C. 154(b) by 0 days.

(21) Appl. No.: 16/775,761

(22) Filed: Jan. 29, 2020

Related U.S. Application Data

(63) Continuation-in-part of application No. 16/579,978, filed on Sep. 24, 2019.

(51) Int. Cl.
*F16M 13/00* (2006.01)
*F16M 13/02* (2006.01)
*F16B 2/22* (2006.01)

(52) U.S. Cl.
CPC ............. *F16M 13/022* (2013.01); *F16B 2/22* (2013.01)

(58) Field of Classification Search
CPC ... F16B 13/02; F16B 1/22; F16B 2/20; F16M 13/02
See application file for complete search history.

(56) References Cited

U.S. PATENT DOCUMENTS

| | | | |
|---|---|---|---|
| 2,179,406 A | 11/1939 | Ray | |
| 2,470,814 A | 5/1949 | Max | |
| 3,611,861 A * | 10/1971 | Schulze | F16B 21/082 411/508 |
| 3,905,570 A * | 9/1975 | Nieuwveld | F16L 3/13 248/71 |
| 4,887,498 A | 12/1989 | Zayat | |
| 5,775,861 A * | 7/1998 | Leon | F16B 5/0642 411/344 |
| 6,406,242 B1 * | 6/2002 | Gordon | E05B 79/06 24/297 |
| 7,090,174 B2 | 8/2006 | Korczak et al. | |
| 7,351,023 B2 * | 4/2008 | Scroggie | F16B 5/123 24/297 |

(Continued)

FOREIGN PATENT DOCUMENTS

| | | |
|---|---|---|
| CA | 2161856 C | 2/1999 |
| CN | 102077023 A | 5/2011 |
| EP | 0149128 B1 | 4/1987 |

OTHER PUBLICATIONS

SSL North America, "Luma Strut Innovative System for LED Lighting," https:\\sslnorthamerica.com/lumastrut, USA., printed on Jun. 20, 2019.

(Continued)

*Primary Examiner* — Amy J. Sterling
(74) *Attorney, Agent, or Firm* — Hanrahan Law Firm, P.A.; Benjamin M. Hanrahan

(57) ABSTRACT

A mounting bracket for attachment to a strut channel is presented herein. The mounting bracket includes an attachment structure and one or more mounting structures. The attachment structure includes at least two clips facing in laterally opposite directions and sized to fit within an opening of a strut channel. The clips can be moved or flexed upon application of appropriate squeezing or inward forces exerted upon the mounting bracket. When the mounting bracket is attached to the strut channel, at least one of the mounting structures is positioned at least partially within the strut channel interior.

10 Claims, 31 Drawing Sheets

(56) References Cited

U.S. PATENT DOCUMENTS

| | | | |
|---|---|---|---|
| 7,866,612 B2 * | 1/2011 | Doi | F16L 3/137 |
| | | | 248/71 |
| 7,926,236 B2 | 4/2011 | Konstantin | |
| 8,240,885 B2 | 8/2012 | Miller | |
| 9,127,807 B1 | 9/2015 | Holloway et al. | |
| 9,518,706 B2 | 12/2016 | Chan et al. | |
| 9,625,134 B2 | 4/2017 | Chien | |
| 9,631,662 B2 * | 4/2017 | Boyer | F16B 37/02 |
| 9,777,908 B1 | 10/2017 | Churnock | |
| 9,803,779 B1 | 10/2017 | Bianchini | |
| 9,879,803 B2 | 1/2018 | Leng | |
| 10,197,254 B2 | 2/2019 | Crandell et al. | |
| 10,253,906 B2 | 4/2019 | Vaccaro | |
| 10,294,675 B2 | 5/2019 | Langeveld | |
| 10,774,864 B2 * | 9/2020 | Shinoda | F16B 21/086 |
| 10,823,312 B2 | 11/2020 | Vaccaro et al. | |
| 2003/0048641 A1 | 3/2003 | Alexanderson et al. | |
| 2003/0089828 A1 | 5/2003 | Korczak et al. | |
| 2005/0169015 A1 | 8/2005 | Luk et al. | |
| 2006/0146531 A1 | 7/2006 | Reo et al. | |
| 2009/0323358 A1 | 12/2009 | Scott | |
| 2011/0084179 A1 | 4/2011 | Wiedner et al. | |
| 2011/0226913 A1 | 9/2011 | Feige | |
| 2011/0286207 A1 | 11/2011 | Chan et al. | |
| 2012/0286110 A1 | 11/2012 | Hill | |
| 2017/0198834 A1 | 7/2017 | Patil et al. | |

OTHER PUBLICATIONS

Unistrut Service Company, "Unistrut Closure Strips for 1-5/8" Channel," https://www.unistrutohio.com/unistrut-closure-strips-1-58-channel, Cleveland, Ohio, USA, printed on Jun. 20, 2019.
Machine-Generated English Translation of CN102077023 obtained at <https://translationportal.epo.org/emtp/translate/?ACTION=description-retrieval&COUNTRY=CN&ENGINE=google&FORMAT=docdb&KIND=A&LOCALE=en_EP&NUMBER=102077023&SRCLANG=zh&TRGLANG=en>.

* cited by examiner

STRUT CHANNEL MOUNTING BRACKET

CLAIM OF PRIORITY/CROSS REFERENCE TO RELATED APPLICATIONS

The present application is a Continuation-In-Part (CIP) Patent Application of previously-filed, currently pending U.S. patent application Ser. No. 16/579,978 filed on Sep. 24, 2019, the content of which is incorporated herein in its entirety by reference.

FIELD OF THE INVENTION

The present invention is generally directed to a mounting bracket for attachment to a strut channel, and more specifically, to a mounting bracket that can be used to mount various secondary or auxiliary structures, including but in no way limited to one or more LED arrays, light fixtures, juncture boxes, wires, pipes, tubes, hooks, hangers, conduits, etc., to a strut channel.

BACKGROUND OF THE INVENTION

Strut channels or metal framing channels are well known in the construction and electrical industries and are often used to mount, brace or otherwise carry structural loads. In particular, a strut channel is often formed from an elongated metal sheet with the sides bent down and inward to provide opposing lips or edges and to define a main opening and an interior volume. In some cases, the sizes of strut channels, and in particular, the size of the opening, internal volume, and lips or edges are standardized. As just an example, UNISTRUT® is the tradename of one such commercially available strut channel.

There are also a number of different styles or variations of strut channels, for example, a solid strut channel (which is constructed to include a solid back panel opposite the strut opening), punched strut channel (which is constructed to include a plurality of holes disposed through the back panel opposite the opening), half-slotted strut channel (which is constructed to include short elongated slots disposed through the back panel opposite the opening), slotted strut channel (which is constructed to include one or more long elongated slots disposed through the back panel opposite the opening), half strut channel (which is constructed to include a smaller internal volume), etc.

While strut channels are commonplace, in order to attach or mount an item to the strut channel, such as an LED fixture, a juncture box, etc., the item must be specifically constructed in order to fit into, and mount to, the strut channel. Accordingly, there is a need in the art for a bracket that is capable of attaching to a strut channel and which can be used to mount various structures or items that are not specifically constructed to mount to strut channels. In other words, it would be beneficial to have a universal mount that could easily attach to a strut channel and which has one or more universal mounting components to which other items or structures can mount.

SUMMARY OF THE INVENTION

Accordingly, the present invention is generally directed to a mounting bracket for connection or attachment to a strut channel or other like device. For instance, the mounting bracket of at least one embodiment includes an attachment section or structure, e.g., a clip or a plurality of flanges to attach to the strut channel, and at least one mounting section or structure, which can include one or more mounting holes, channels, grooves, etc. In some cases, with the bracket attached to the strut channel, the mounting structure is positioned at least partially within the strut channel, while in other embodiments, the mounting structure is positioned external to the strut channel.

Furthermore, the attachment section of at least one embodiment of the present invention includes a first leg and a second leg extending from the mounting section, with a first clip and a second clip attached to corresponding legs. The clips include one or more flanges that are cooperatively sized and structured such that they can mount to a strut channel opening. The clips are capable of being partially moved or flexed inward and/or outward when a corresponding force is applied to designated portions of the bracket. For example, when an angled or an upward/inward force is applied to an outside surface of the clips, the clips, and in particular the flanges, will flex inward allowing them to pass into the strut channel. When a squeezing force is simultaneously applied to the legs, the clips will then flex outward and can engage the inside edges of the strut channel.

These and other objects, features and advantages of the present invention will become more apparent when the drawings as well as the detailed description are taken into consideration.

BRIEF DESCRIPTION OF THE DRAWINGS

FIG. 8G is another perspective view of the lock illustrated in FIGS. 8A-OF.

Like reference numerals refer to like parts throughout the several views of the drawings provided herein.

DETAILED DESCRIPTION OF THE INVENTION

Figure 1:
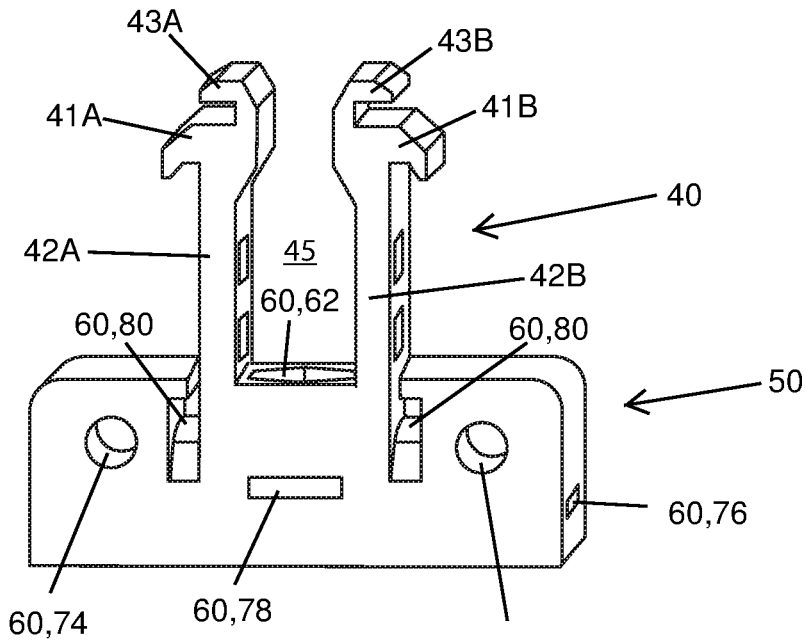
FIG. 1 is a front perspective view of the mounting bracket as disclosed in accordance with at least one embodiment of the present invention.
Figure 2A:
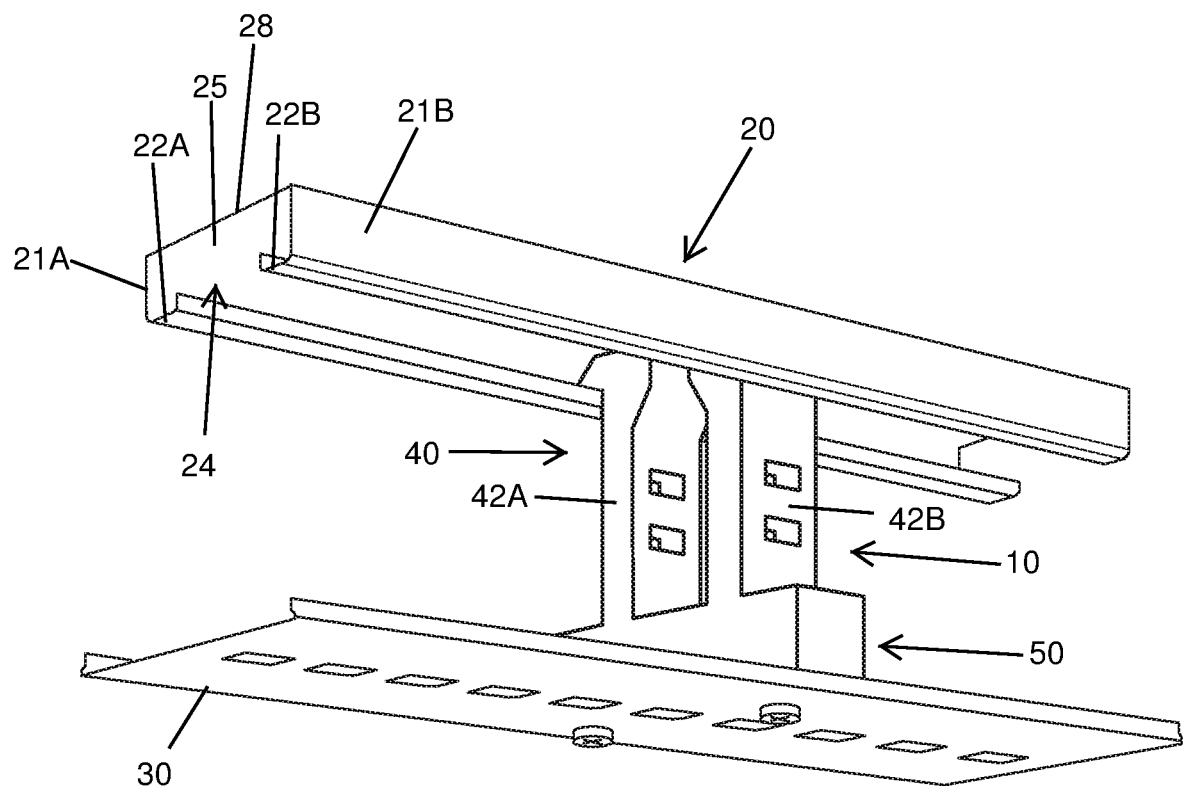
FIG. 2A is a perspective view of the mounting bracket of at least one embodiment of the present invention attached to an opening of a strut channel and with an LED fixture mounted thereto.
Figure 2B:
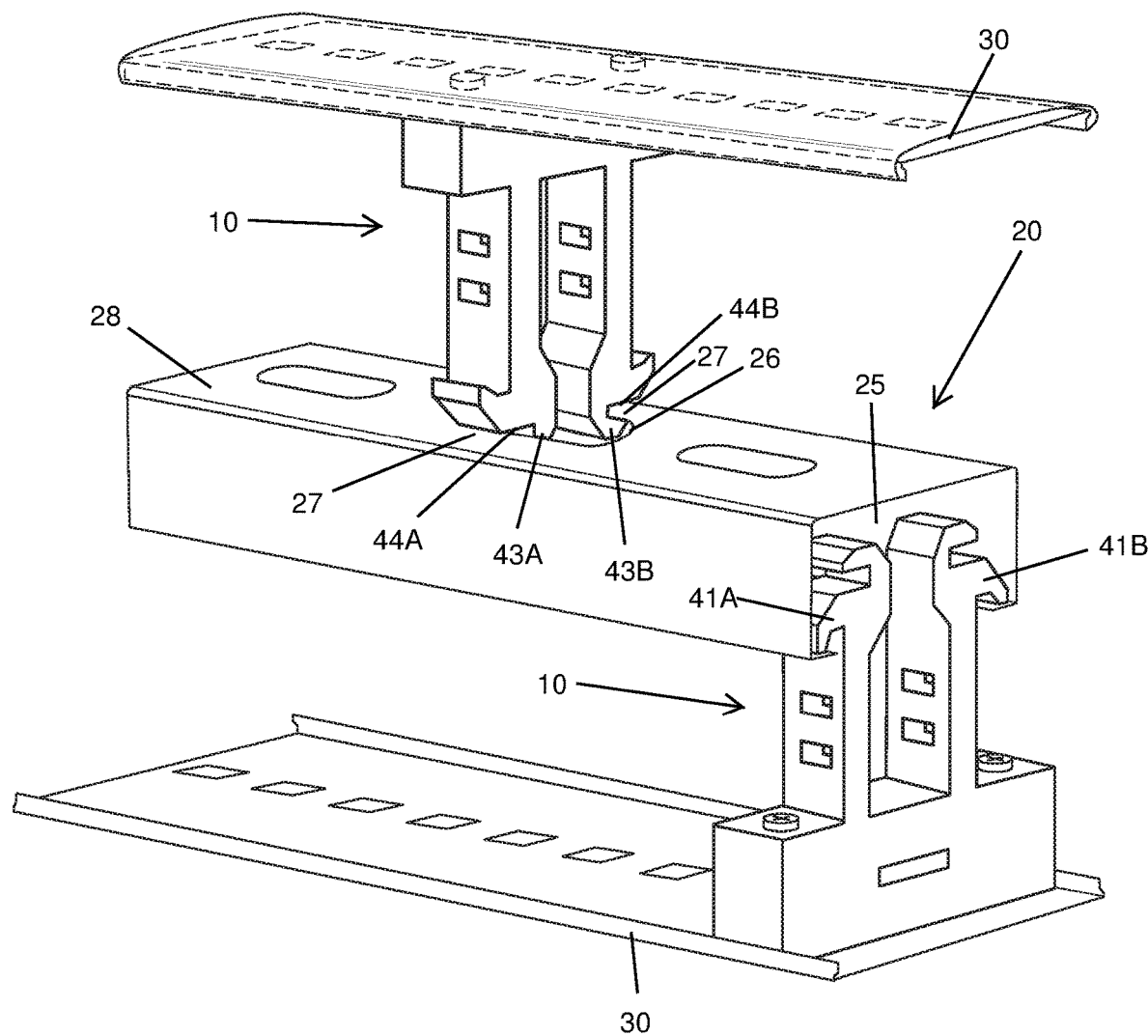
FIG. 2B is a perspective view of the mounting bracket illustrated in FIG. 2A attached to a different opening of a strut channel and with an LED fixture mounted thereto.

As shown in the accompanying drawings, and with particular reference to FIGS. 1, 2A and 2B, for example, the present invention is directed to a mounting bracket, referenced as 10. The mounting bracket 10 of the various embodiments disclosed herein is configured to attach to a support, including, but not limited to a strut channel 20, and to which a secondary or an auxiliary structure 30 is able to mount.

More in particular, a strut channel 20 is a structural system or device that is, in many cases, standardized for use in construction and electrical industries for supporting a variety of items. As just an example, UNISTRUT® is the tradename of one such commercially available strut channel 20, although others exist in the market. Furthermore, a strut channel 20 is often formed from an elongated metal sheet with the sides bent down and inward to provide or define sides 21A, 21B, opposing lips or edges 22A, 22B, opening 24, interior volume or area 25, and back panel 28.

Figure 2C:
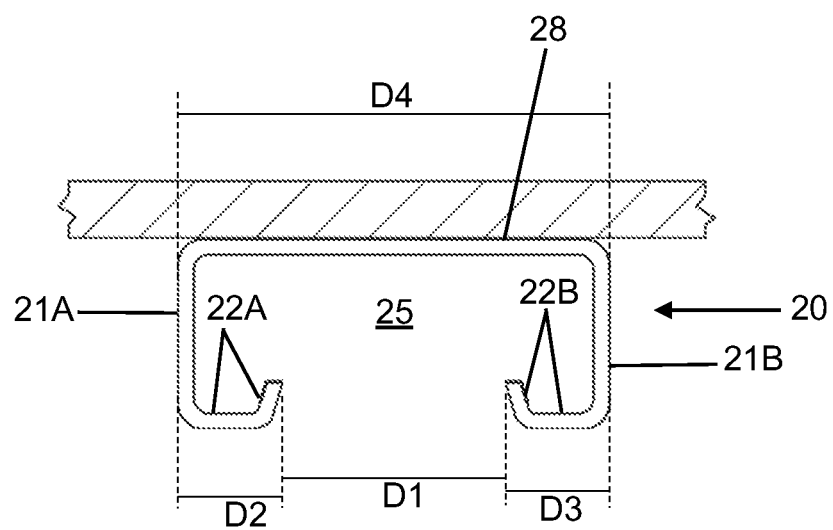
FIG. 2C is a side view of an exemplary strut channel mounted to a support.

With reference to FIG. 2C, an end view of an exemplary strut channel 20 is shown. The main strut opening measured between inner edges of the lips 22A, 22B of the strut channel 20 is referenced as D1; the distances between the inner edges of the lips 22A, 22B and the outside wall are referenced as D2 and D3; and the distance between the two outside walls is referenced as D4. As mentioned above, the strut channel 20 in many cases is standardized and may have standardized sizes wherein D1 is approximately or equal to ⅞ inches, D2 and D3 are approximately or equal ⅜ inches and D4 is approximately or equal to 1⅝ inches. However, it should be apparent that other strut channels 20 may have different sizes or dimensions and certain embodiments of the bracket 10 of the present invention may be sized to fit different supports other than a strut channel 20.

Moreover, there are a number of different styles or variations of strut channels 20, for example, a solid strut channel, punched strut channel, half-slotted strut channel, slotted strut channel, half strut channel, etc. As will become apparent from the description provided herein, the various embodiments of the present invention are designed to attach or mount to a strut channel 20, and in some embodiments, different sized strut channels or different areas or sides of the same strut channel 20. For example, the bracket 10 of at least one embodiment may mount or attach to the strut channel 20 through the main strut opening 24 and/or one or more slots or openings disposed through the back panel 28 of the strut channel 20.

Specifically, the bracket 10 of at least one embodiment includes an attachment structure or section 40, and an auxiliary mounting structure or section 50. The attachment structure 40 and auxiliary mounting structure 50 may be integrally formed as a single piece or structure or, in some cases, may be separate pieces attachable to one another, either removably or fixedly. The attachment structure 40 of the various embodiments is configured to attach or mount to a support, such as a strut channel 20, whereas the auxiliary mounting structure or section 50 is configured to receive or mount to one or more auxiliary structures 30, including, but in no way limited to a light emitting diode (LED) array or fixture (FIGS. 2A and 2B), another light fixture, a juncture box, a wire, a pipe, a tube, a hook, a hanger, a conduit, etc. In this manner, the bracket 10 of the various embodiments disclosed herein can be used as a way to indirectly mount virtually any item or structure, e.g., an auxiliary structure 30, to a strut channel 20 or other support.

More specifically, and still referring to FIG. 1, the attachment structure or section 40 of at least one embodiment includes one or more columns or legs 42A, 42B extending from the auxiliary mounting structure or section 50. In the orientation shown in FIG. 1, for example, the bracket 10 includes two legs 42A, 42B extending in a substantially vertical or upright relation from the auxiliary mounting structure 50, although it should be noted that the leg(s) 42A, 42B may extend at an angle, for example, in an outward or inward angle, from the mounting structure or section 50. It should also be noted in some embodiments, not shown, the attachment structure or section 40 may include a single column or leg extending, or more than two columns or legs.

Referring to the embodiment shown in FIG. 1, the bracket includes a first leg 42A and a second leg 42B extending from the auxiliary mounting structure or section 50 and terminating with or at a plurality of flanges, fingers or clips, referenced as 41A, 41B, 43A, 43B. An opening 45 is formed between the legs 42A, 42B, within which a portion of a lock 100 can be disposed in accordance with at least one embodiment, as disclosed herein.

Moreover, the flanges of at least one embodiment are defined by at least one set of opposing flanges 41A, 41B and/or 43A, 43B, which can engage onto or otherwise mount to a portion of the strut channel 20, for example, to the lips or ledges 22A, 22B of the main opening 24 and/or to one or more slots or openings 26 on a back panel 28 of a strut channel 20 or other support.

For instance, the two legs 42A, 42B, of at least one embodiment, are able to be slightly flexed or bent inward toward the opening 45. Doing so will help facilitate positioning an upper or end portion of the attachment structure 40 at least partially within the interior volume 25 of the strut channel 20 so that at least one set of opposing flanges 41A, 41B, and/or 43A, 43B can engage onto the lips or ledges 22A, 22B of the strut channel 20, as shown for example in FIG. 2A, and/or onto the edges of an opening or slot 26 disposed on the back panel 28, as shown for example in FIG. 2B. It should also be noted that in certain embodiments, a user may not need to manually squeeze or flex the legs 42A, 42B inward in order to mount the bracket 10 to a strut channel 20. For example, in some cases, the bottom or outwardly facing surface of the lips or ledges 22A, 22B of the strut channel 20 may have a curved or angled surface and/or the outer or end surface of the flanges 41A, 41B and/or 43A, 43B may be curved or angled such that forcing the surfaces of the flanges 41A, 41B, 43A, 43B together with the surfaces of the strut channel 20 will cause the legs 42A, 42B to slightly bend or flex inward allowing the flanges 41A, 41B and/or 43A, 43B to enter the inner volume 25 of the strut channel 20.

With reference to FIG. 2B, for example, one bracket 10 may be attached to one side of the strut channel 20, for example, the main opening 24 thereof, whereas another bracket 10 can be attached to the other side of the same (or different) strut channel 20, for example, via the smaller holes or channels 26 disposed on or through the back panel 28 of the strut channel 20.

Furthermore, although the embodiment shown in FIG. 1, for example, illustrates an attachment structure or section 40 with two pairs or sets of opposing flanges—e.g., a first set of opposing flanges 41A, 41B, and a second set of opposing flanges 43A, 43B—in some embodiments only a single set of opposing flanges is contemplated.

In any event, in the embodiment with two (or more) sets of opposing flanges 41A, 41B, 43A, 43B, the first set of opposing flanges 41A, 41B is sized and configured to mount to or engage with a strut channel opening 24 of one size (e.g., FIG. 2A) while the second set of opposing flanges 43A, 43B is sized and configured to mount to or engage with a strut channel opening 26 of a different size (e.g., FIG. 2B). More specifically, in at least one embodiment, the first set of flanges 41A, 41B may be sized to engage with the lips or ledges 22A, 22B of a strut channel 20 (FIG. 2A), whereas the second set of opposing flanges 43A, 43B may be sized to engage with one or more slots 26 of a slotted strut channel or a half-slotted strut channel (FIG. 2B).

Figure 4A:
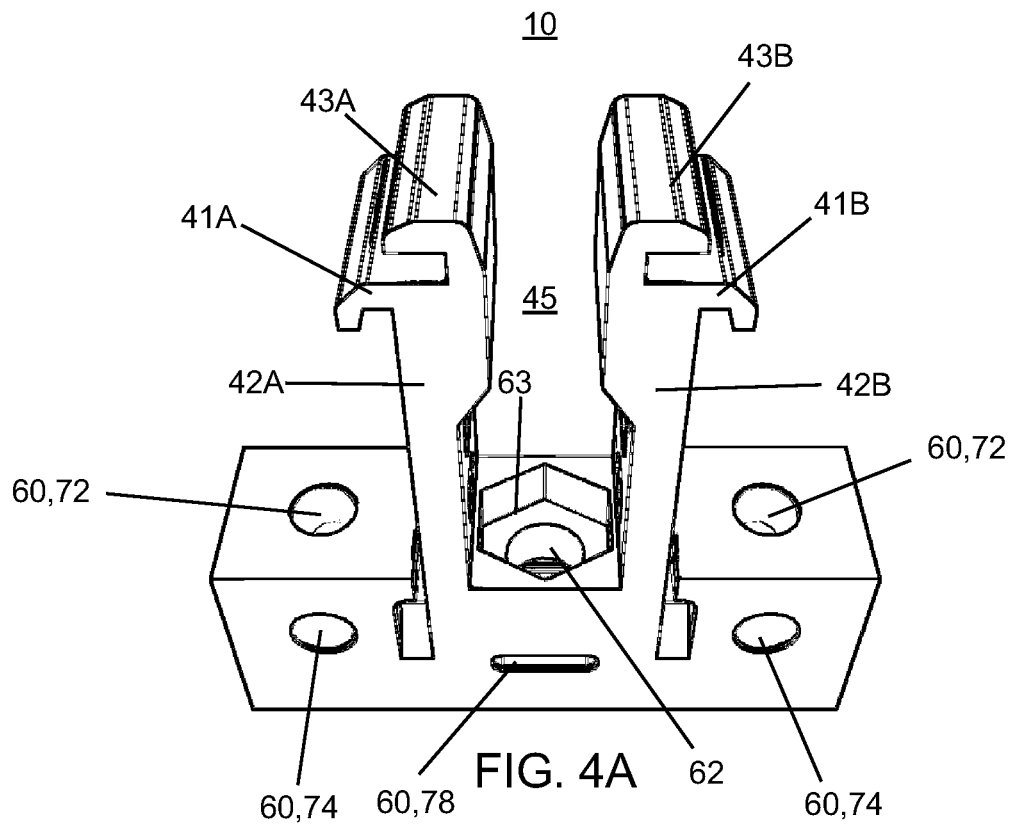
FIG. 4A is a top perspective view of the mounting bracket as disclosed in accordance with at least one embodiment herein.
Figure 4B:
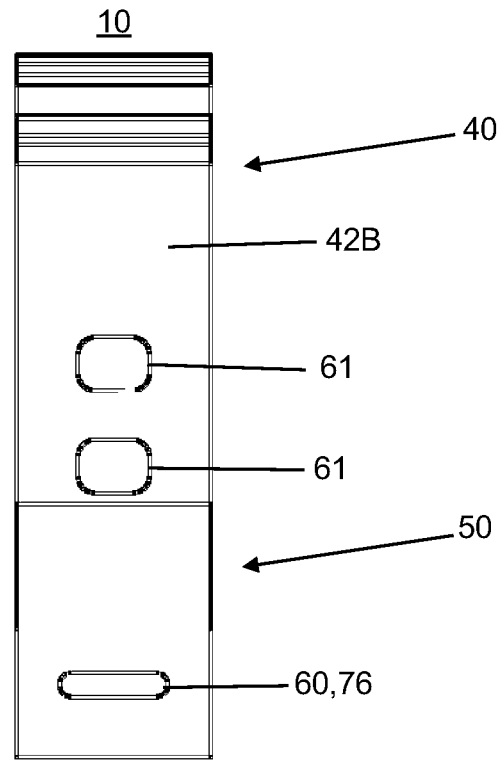
FIG. 4B is a side view of the mounting bracket illustrated in FIG. 4A.
Figure 4C:
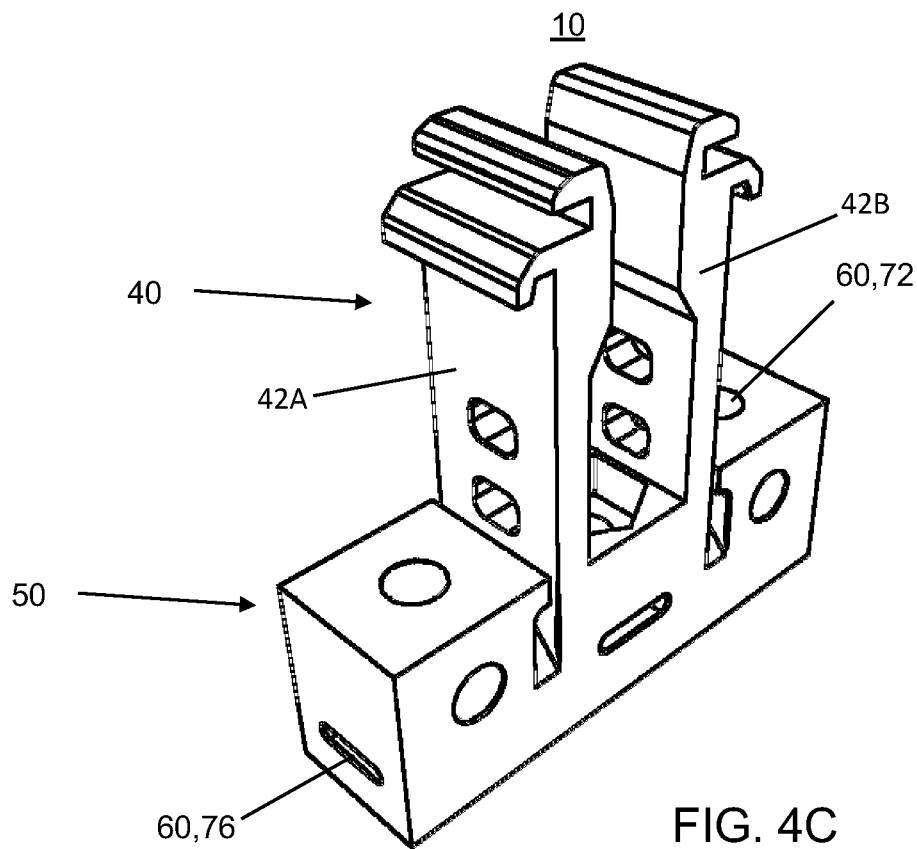
FIG. 4C is another perspective view of the mounting bracket illustrated in FIGS. 4A and 4B.
Figure 4D:
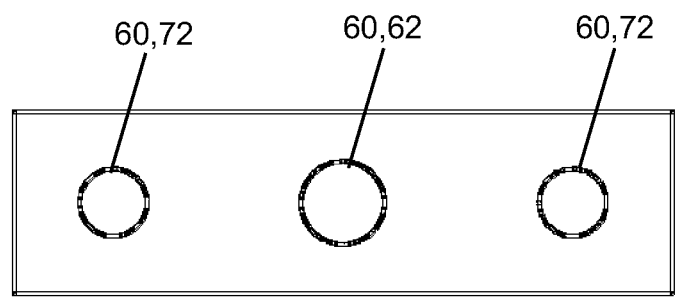
FIG. 4D is a bottom view of the mounting bracket illustrated in FIGS. 4A-4C.
Figure 4E:
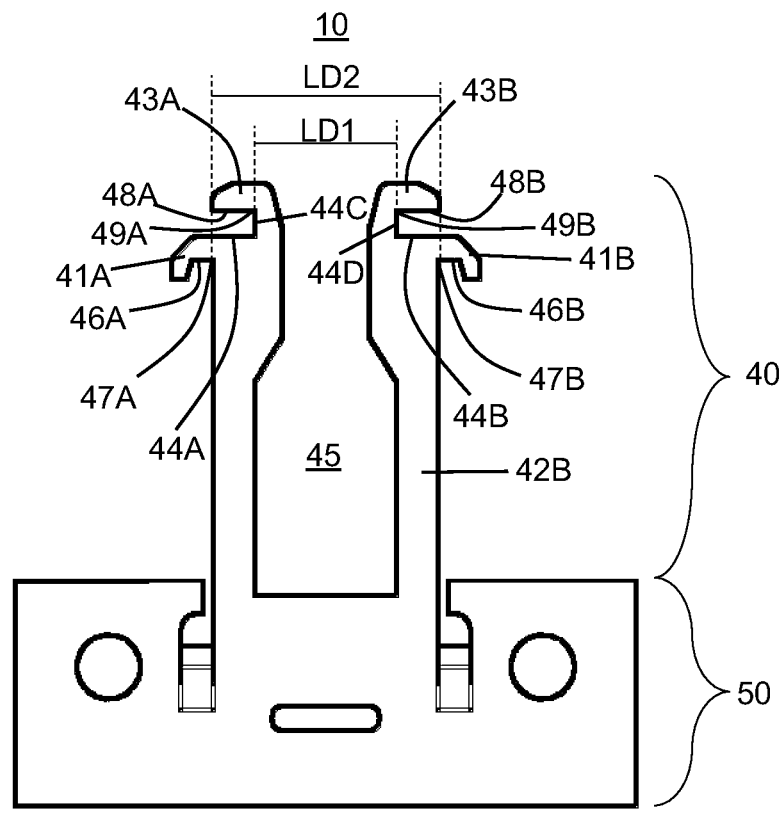
FIG. 4E is a front elevation view of the mounting bracket illustrated in FIGS. 4A-4D.
Figure 4F:
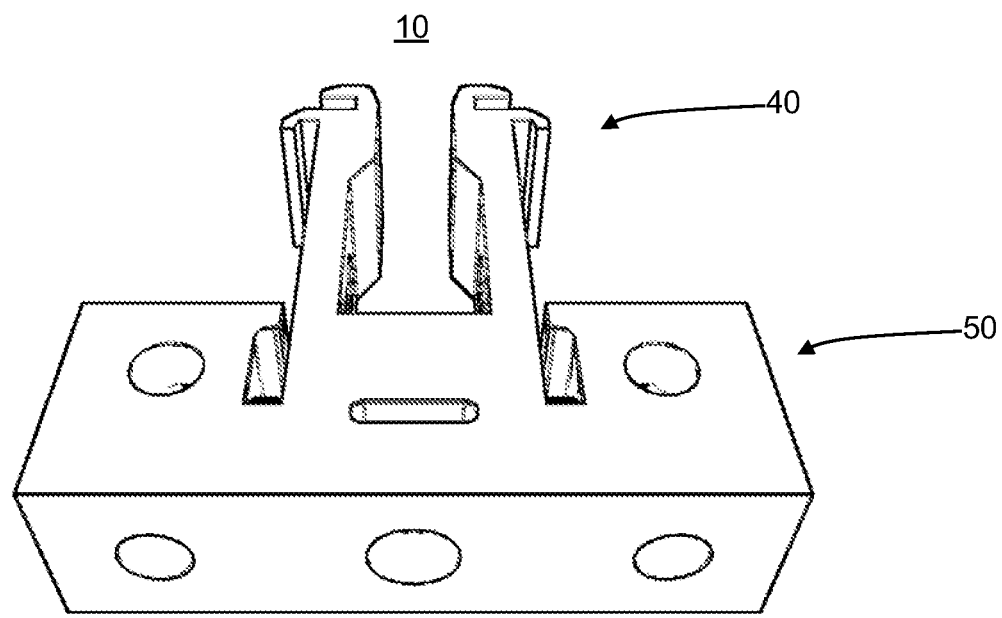
FIG. 4F is a bottom perspective view of the mounting bracket illustrated in FIGS. 4A-4E.
Figure 4G:
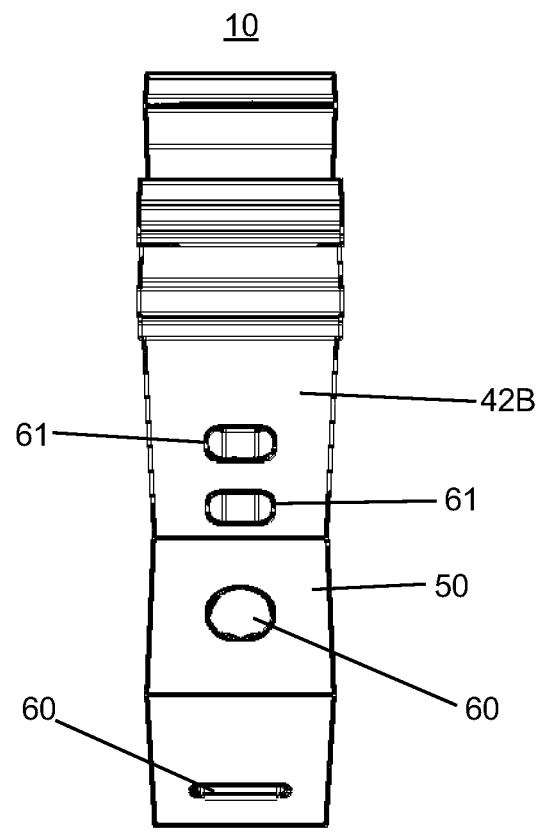
FIG. 4G is a perspective view of the side of the mounting bracket illustrated in FIGS. 4A-4F.
Figure 4H:
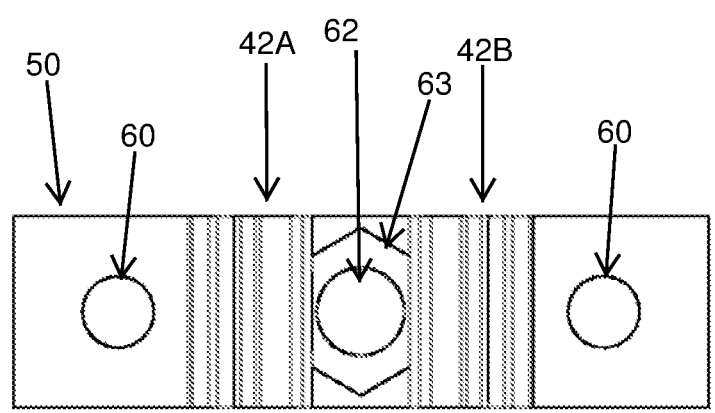
FIG. 4H is a top view of the mounting bracket illustrated in FIGS. 4A-4G.
Figure 5A:
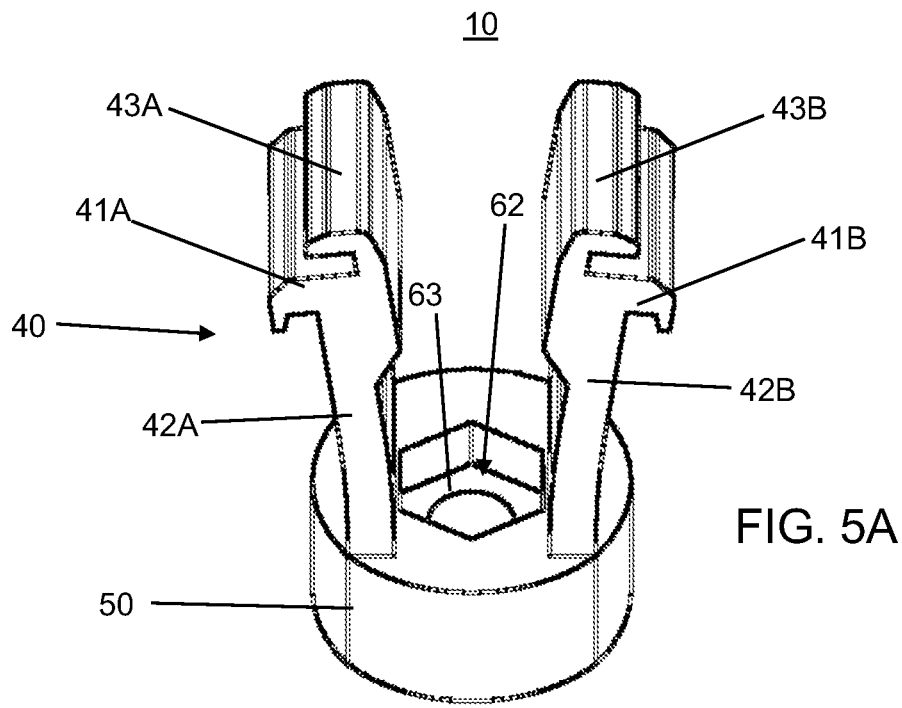
FIG. 5A is a perspective view of the mounting bracket as disclosed in accordance with another embodiment herein.
Figure 5B:
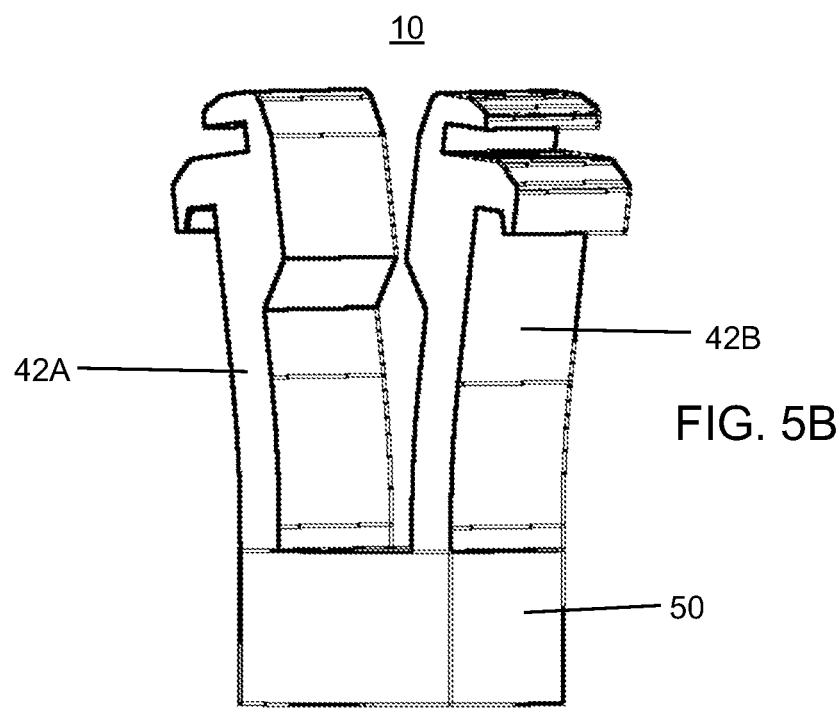
FIG. 5B is another perspective view of the mounting bracket illustrated in FIG. 5A.
Figure 5C:
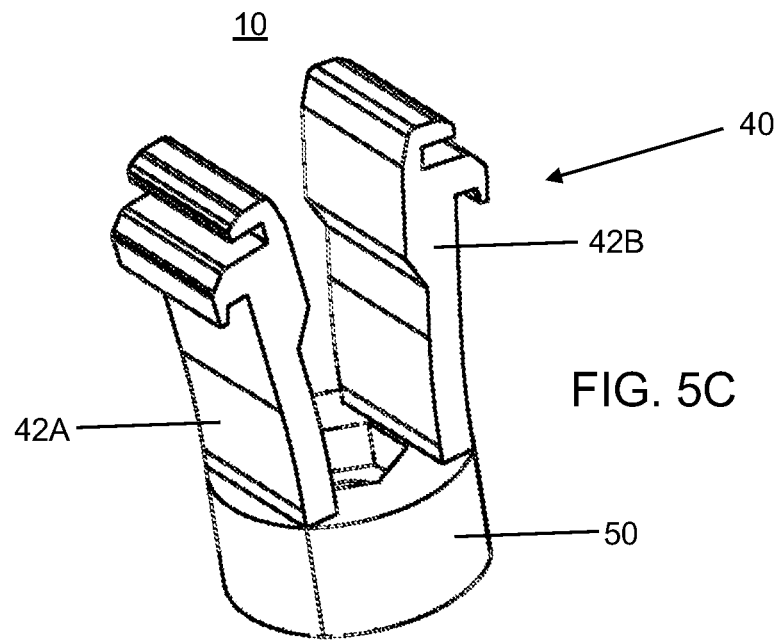
FIG. 5C is another perspective view of the mounting bracket illustrated in FIGS. 5A-5B.
Figure 5D:
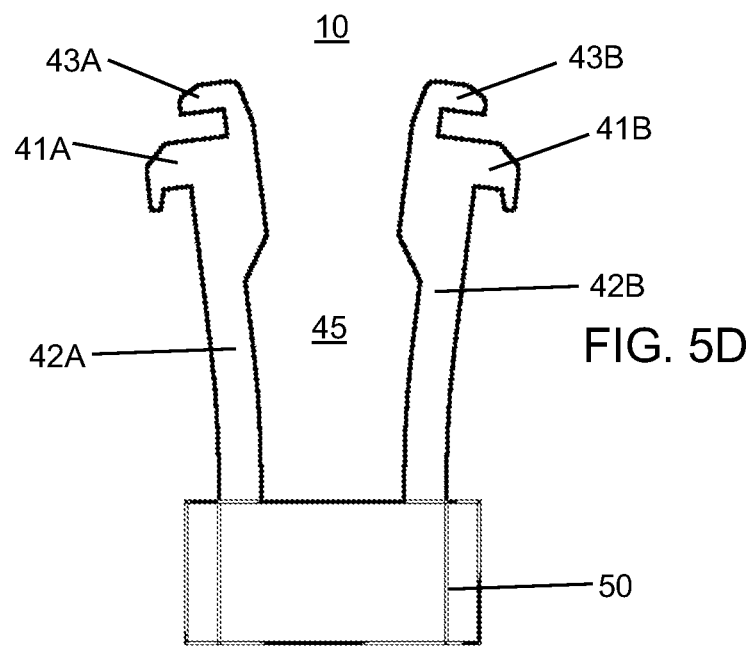
FIG. 5D is a front elevation view of the mounting bracket illustrated in FIGS. 5A-5C.

Furthermore, with reference to FIGS. 4A through 4H, and particularly FIG. 4E, the first set of opposing flanges 41A, 41B are disposed at or near the end of the first and second legs 42A, 42B, respectively, and extend in opposite lateral directions defining a first set of engaging ledges 46A, 46B. In at least one embodiment, the first set of opposing flanges 41A, 41B include a downwardly facing lip at the distal ends thereof. An inner edge 47A, 47B is defined where the outward flange 41A, 41B meets the outer surface of the corresponding leg 42A, 42B. Receiving areas are defined by ledges 46A, 46B, including the downwardly facing lip thereof, the inner edge or corner 47A, 47B, and inner walls or surfaces 44C, 44D.

The second set of opposing flanges 43A, 43B are disposed in at least partially offset longitudinally spaced relation from at least a portion of the first set of opposing flanges 41A, 41B. For example, in the orientation illustrated in FIG. 4E, the second set of opposing flanges 43A, 43B extend longitudinally outward or upward, and are at least partially offset inward, from the first set of opposing flanges 41A, 41B. Furthermore, flanges 43A, 43B extend in opposite lateral directions from one another, although in the same lateral directions as flanges 41A, 41B, respectively, and define a second set of engaging ledges 48A, 48B. An inner edge or corner 49A, 49B is defined where the corresponding engaging ledges 648A, 48B meet extension wall 44E, 44F. In this manner, receiving areas are defined by the ledges 48A, 48B, surface or wall 44A, 44B of the first set of opposing flanges, and extension wall 44E, 44F.

Accordingly, in at least one embodiment, inner walls or surfaces 44E, 44F of the receiving areas of the second set of opposing flanges 43A, 43B are disposed in an inwardly offset relation from the inner walls or surfaces 44C, 44D of the receiving areas of the first set of opposing flanges 41A, 41B.

Still referring to FIG. 4E, a first lateral distance LD1 is measured between the inner edge 47A of the first engaging ledge 46A of the first set of engaging ledges 46A, 46B and the inner edge 47B of the second engaging ledge 46B of the first set of engaging ledges 46A, 46B. Similarly, a second lateral distance is measured between the inner edge 49A of the first engaging ledge 48A of the second set of engaging ledges 48A, 48B and the inner edge 49B of the second engaging ledge 48B of the second set of engaging ledges 48A, 48B.

In at least one embodiment, the two lateral distances, LD1 and LD2, are different than one another, thereby allowing the bracket 10 to mount to different sized holes depending on which set of opposing flanges 41A, 41B or 43A, 43B are used. Again, this is shown in FIG. 2A where the first set of opposing flanges 41A, 41B are used to mount or attach the bracket 10 to the lips or ledges 22A, 22B of the man opening in a strut channel 20, as compared to FIG. 2B where the second set of flanges 43A, 43B of one of the brackets 10 are used to mount or attach the bracket 10 to the one or more slots 26 of a slotted or half-slotted strut channel 20.

In this manner, the lateral distance LD1 may be sized to accommodate the opening of a strut channel 20 between the two opposing lips 22A, 22B, which as shown in the example of FIG. 2C may have a distance D1 of approximately or equal to ⅞ inches. As such, in at least one exemplary embodiment, the distance LD1 may be the same or approximately the same size as D1. The ledges 46A, 46B are therefore sized to extend into the inner volume 25 of the strut channel 20 between the outer surface of the lip 22A, 22B and the inner lateral surface of the strut channel, illustrated as D2 and D3.

Similarly, the lateral distance LD2 may be sized to accommodate the slot opening 26 of a slotted or half-slotted strut channel 20. The flanges 43A, 43B may be sized to fit within the inner volume 25 of the strut channel 20 in a manner to engage the bracket thereto.

Accordingly, in at least one embodiment, the first lateral distance LD1 is greater than the second lateral distance LD2. It should be noted again, however, that other embodiments of the present invention may include a different sized bracket 10 or a bracket 10 designed to engage with a different strut channel or a different support other than a strut channel. Accordingly, the sizes and dimensions provided herein are for exemplary purposes only.

Referring again to FIG. 1, the bracket 10 of at least one embodiment of the present invention includes an auxiliary mounting structure or section 50 which is designed to allow auxiliary structures to mount to the bracket 10. As just some example, the auxiliary structures may include, but are in no way limited to, light or LED fixtures (e.g., FIGS. 2A, 2B), pipes or cables (e.g., FIG. 3A), hooks (FIG. 3C), etc.

Accordingly, in order to allow one or more various and non-specific auxiliary devices to attach or mount to the bracket 10, the bracket 10, and in particular the auxiliary mounting section 50 thereof, includes at least one structural mounting component 60 or feature. For example, in at least one embodiment, the structural mounting component 60 may include a longitudinal hole 62 extending through the bracket 10 or otherwise completely through the auxiliary mounting structure 50. In the embodiment shown, longitudinal hole 62 is axially aligned with a center longitudinal axis (not shown) of the bracket 10, passing lengthwise between the center of the legs 42A, 42B, although it need not be.

Figure 3D:
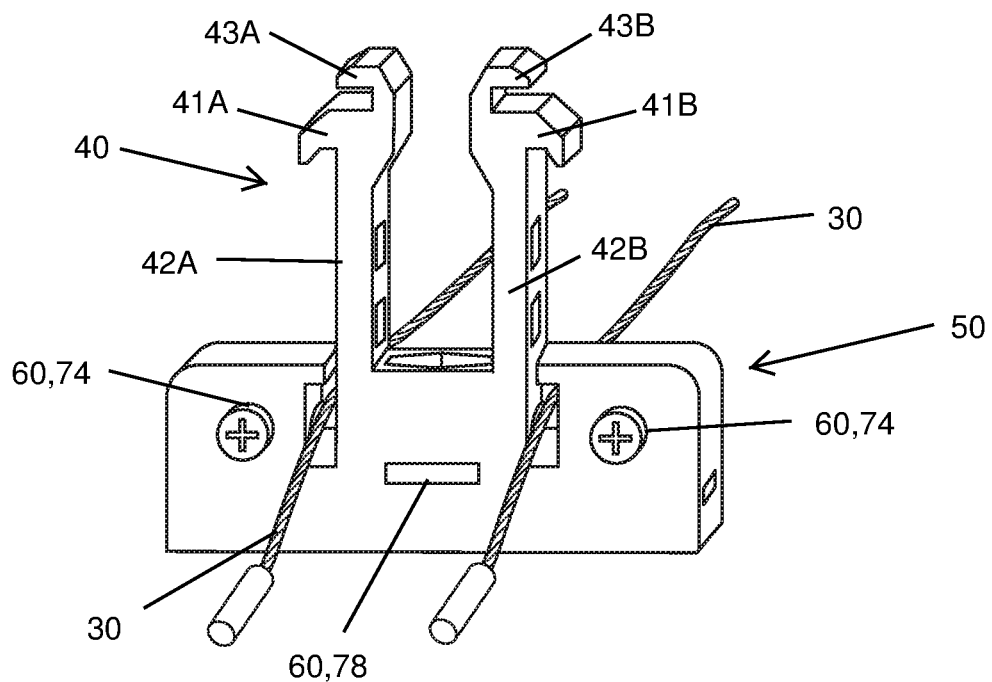
FIG. 3D is a perspective view of the mounting bracket as disclosed in accordance with at least one embodiment showing two wired cables disposed through corresponding slotted channels of the mounting structure.
Figure 3A:
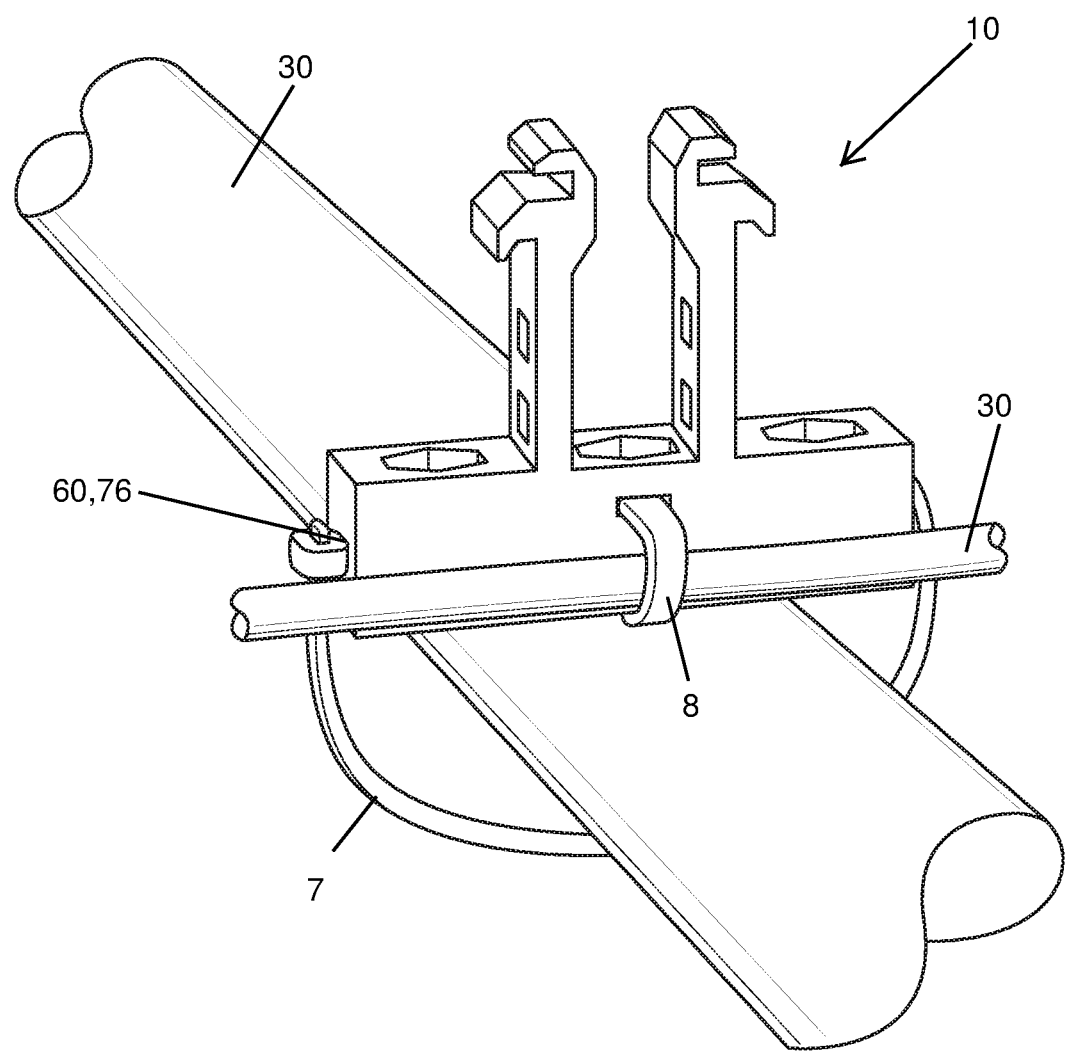
FIG. 3A is a perspective view of the mounting bracket as disclosed in accordance with at least one embodiment herein with a large elongated pipe mounted thereto with a zip tie and a smaller cable also mounted thereto with a different zip tie.
Figure 3B:
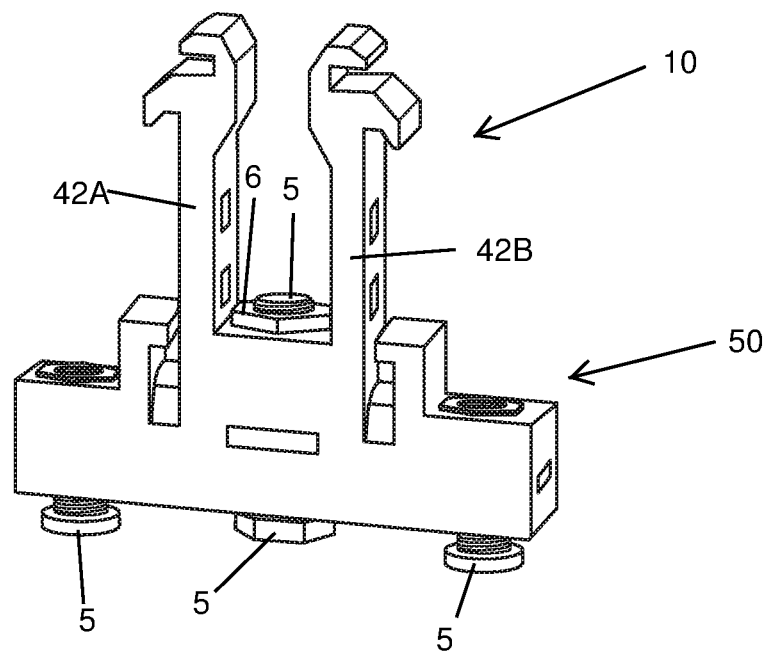
FIG. 3B is a perspective view of the mounting bracket as disclosed in accordance with at least one embodiment herein showing a plurality of different hardware or fasteners that can be used to mount auxiliary structures thereto.
Figure 3C:
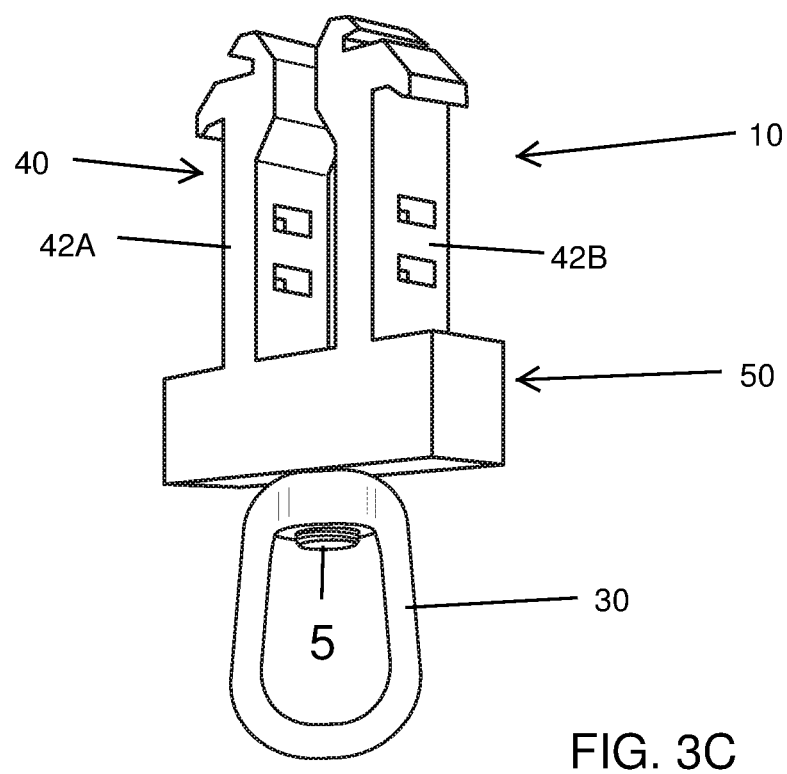
FIG. 3C is a perspective view of the mounting bracket as disclosed in accordance with at least one embodiment herein with an attachment hanger mounted thereto.

More in particular, the longitudinal hole 60 may, in some cases, terminate at the opening 45 defined by the legs 42A, 42B described above. The longitudinal hole 62 may extend all the way through the auxiliary mounting structure or section 50 allowing a bolt, screw or other fastener 5 to be disposed therethrough, as shown in FIGS. 3B and 3C for example. This allows a fastener 5 to pass through the auxiliary mounting structure or section 50 where a hex nut 6 or other like device can be used to secure the fastener 5 in place. Some embodiments may include a recessed collar 63 at a top or first end of the longitudinal hole 62 sized and dimensioned to receive a hexagonal nut 6 or other fastening structure therein. This allows the nut 6 or other structure to sit within the recessed collar 63 so to not protrude into opening 45.

In any event, the center or longitudinal hole 62 can be used to secure virtually any item to the center of the bracket 10, including a hook, as shown in FIG. 3C, as just an example.

Furthermore, the various embodiments of the bracket 10 disclosed herein can include one or a plurality of various mounting components 60 sized and disposed in order to facilitate the connection or mounting of a wide array of different auxiliary structures.

For instance, with reference to the embodiment illustrated in FIGS. 4A through 4H, the various mounting components 60 can include additional longitudinal holes 72 offset from the center longitudinal axis. These holes 72 may be threaded in order to accept and retain a threaded fastener or the holes 72 may be smooth or otherwise not threaded allowing for the attachment of a fastener 5, such as a bolt, and nut 6, or other like fastening device or combination of devices. FIGS. 2A and 2B illustrate an exemplary embodiment with the two offset longitudinal holes being used to mount an LED fixture 30. It should also be noted that the offset longitudinal holes 72 may include a recessed collar similar to the recessed collar 63 of at least one embodiment of the axial longitudinal hole 62.

Still referring to the embodiment illustrated in FIGS. 4A through 4H, the bracket 10 and in particular the auxiliary mounting section 50 thereof may include mounting components 60 which include mounting holes 74 passing through the bracket between the front and the back surfaces thereof. These holes 74 may be threaded in order to accept and retain a threaded fastener or the holes 74 may be smooth or non-threaded allowing for the attachment of a fastener 5 and nut 6, or other like fastening device or combination of devices. FIG. 3D illustrates exemplary fasteners disposed through or into holes 74, to which an auxiliary structure 30 may attach. It should also be noted that holes 74 may include a recessed collar on one or both ends.

Furthermore, the structural mounting component(s) 60 of at least one embodiment may also or instead include one or more laterally disposed channels 76 passing through the entire mounting section 50 from one side to the other side. In the embodiments shown, the channels 76 are flat, elongated channels sized to receive a zip-tie, string, cord, etc. there though. This provides a high degree of flexibility and versatility in terms of mounting auxiliary structures 30 to the bracket 10. In particular, a zip tie, string, cord, or other like fastening device can be threaded or passed entirely through the mounting section 50, wrapped around an object or auxiliary structure 30, and fastened (e.g., tightened, tied, or otherwise secured). FIG. 3A illustrates a zip tie 7 passing through the bracket 10 via flat, elongated hole 76 and wrapped around a large pipe that passes under the bracket 10.

In addition, some embodiments may include one or more channels 78 disposed completely through the bracket 10 between the front and rear surfaces. In the embodiments shown, channels 78 are flat and elongated, similar to channels 76, and sized to receive a zip tie, string, cord, etc. there through. In particular, a zip tie, string, cord, or other like fastening device can be threaded or passed entirely through the mounting section 50, wrapped around an object or auxiliary structure 30, and fastened (e.g., tightened, tied, or otherwise secured). FIG. 3A illustrates a zip tie 8 passing through the bracket 10 via flat, elongated hole 78 and wrapped around a small cable is positioned adjacent the bracket 10. It should be noted that the cable could be positioned under the bracket 10, as well, if the pipe was not there.

Additional structural mounting components 60 may include one or more slotted (as shown in FIG. 1, e.g.) or closed channels 80 formed at a bottom end of at least one of the first leg 42A or the second leg 42B. Specifically, the channel 80 passes through the bracket 10 between front and rear surfaces and may be sized to receive a wire cable (as shown in FIG. 3D, e.g.,) or other similarly shaped device therein. In some cases, the channel 80 may include a slot 82 at the top through which the cable or other structure may pass.

FIGS. 5A through 5D illustrate another embodiment of the bracket 10 of the present invention. In this embodiment, similar to other embodiments, the attachment structure or section 40 extends from the base or mounting structure or section 50. In this embodiment, as shown in the elevation view of FIG. 5D, the legs 42A, 42B extend in a slightly outwardly curved or angled manner from the base or mounting section 50. In addition, the embodiment includes a single mounting component 60, in this case, the axial or longitudinal hole 62 through which a fastener can be disposed. A recessed collar portion 63 is shown at the top end of the hole 62 or otherwise where the hole 62 meets the opening 45 defined by the two legs 42A, 42B.

In the embodiment shown in FIGS. 5A, 5B, 5C and 5D, and similar to at least some of the embodiment previously described, an auxiliary structure 30 (e.g., a light fixture, juncture box, etc.) can be mounted directly to the base or mounting structure 50 via a fastener disposed through hole 62, and in some cases, a nut or other like fastening device disposed at the top end or within collar 63. In other embodiments, however, one or more additional auxiliary mounting structures 90 can be removably mounted to the bracket 10 and/or to the mounting structure 50 thereof.

Figure 6:
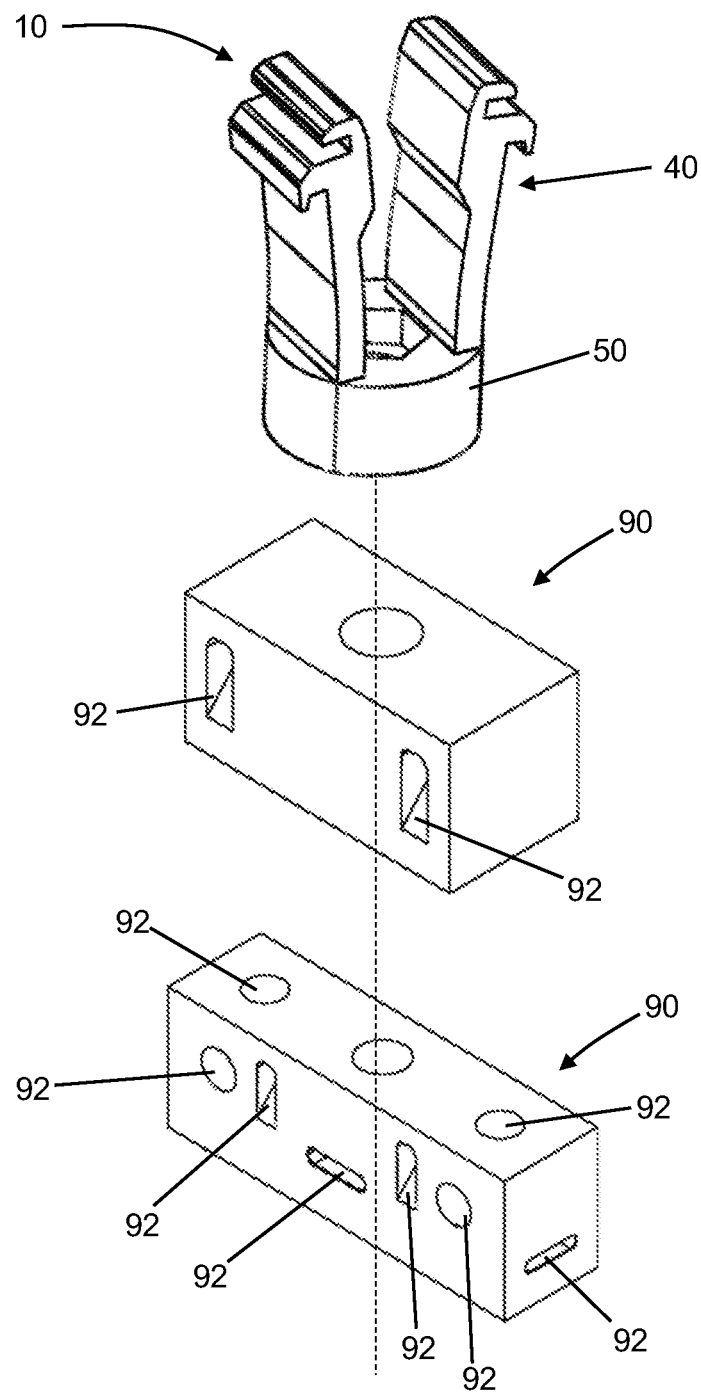
FIG. 6 is an exploded view illustrating the mounting bracket of yet another embodiment along with two additional auxiliary mounting structures attachable thereto.

Specifically, with reference to FIG. 6, additional mounting structures 90 are shown in exploded view attachable to the bracket 10 or mounting structure 50 thereof. Each of the one or more additional mounting structures 90 may include one or a plurality of different mounting components 92, such as mounting holes, zip tie channels, wire slots, screw or bolt holes, etc. This allows additional mounting components 92 to be added to the bracket 10 and provides additional versatility for use.

In addition to being removably attachable to the bracket 10, the one or more additional auxiliary mounting structures 90 may also be selectively rotatable relative to the bracket 10. Specifically, in the embodiment shown where the additional auxiliary mounting structure is mounted to the bracket 10 via a single axial fastener (not shown) disposed through the axial or longitudinal hole 62, the additional auxiliary mounting structure 90 may be selectively rotated about longitudinal axis A to a desired position.

Furthermore, with reference now to FIGS. 7A through 10, at least one embodiment of the present invention also includes a lock 100. Specifically, since in at least one embodiment, the legs 42A, 42B of the bracket 10 may be at least partially inwardly flexible or bendable—e.g., in order to squeeze the flanges 41A, 41B and/or 43A, 43B into an engaging relation with the strut channel 20 or other support—it may be desirable to restrict or prevent those legs 41A, 41B and/or 43A, 43B from being inadvertently flexed or bent inward while the bracket 10 is attached to the strut channel 20 and particularly when an auxiliary structure 30 is mounted thereto.

Accordingly, in at least one embodiment, the lock 100 includes a column 102 that is sized to at least partially fit within the opening 45 defined by and between the legs 42A, 42B. Specifically, in the exemplary embodiment shown in FIG. 7A, the opening 45 is wider near the mounting section 50 and tapers inward at or near the flanges 41A, 41B, 43A, 43B. In this manner, the column 102 of the lock 100 of at least one embodiment includes a body that is wider at the bottom or base and tapers inward near the top or opposite end in order to match or correspond to the shape and size of the opening 45. Other shapes and sizes of both the opening 45 and the column 102 of the lock 100 are contemplated within the full spirit and scope of the present invention.

In any event, with the column 102 of the lock 100 disposed within the opening 45, the column 102 will resist or prevent the legs 42A, 42B from inadvertently bending or flexing inward. For example, sides 115A, 115B of the column 102 of the lock 100 are disposed adjacent to and in some cases in contact with the corresponding inner surfaces of legs 42A, 42B, respectively. Accordingly, with the lock 100 in place as illustrated in exemplary FIG. 7B, any attempt to bend or flex the legs 42A, 42B inward toward the opening 45 would cause the legs 42A, 42B to contact or engage the outer surface of the column 102, thereby preventing or restricting further inward movement of the legs 42A, 42B. In this manner, when the bracket 10 of at least one embodiment is attached to a strut channel 20, for example, as shown in FIG. 7C, and the lock 100 is in place where the column 102 is disposed within the opening 45, the legs 42A, 42B are prevented from being flexed or bent inward enough to release the flanges 41A, 41B and/or 43A, 43B from engagement with the strut channel 20.

Further features of the lock 100 of at least one embodiment may include an outer or at least partially surrounding structure 110 extending from a portion of the lock 100 and including a first arm 112A and a second arm 112B. In some embodiments, bridge 112C may connect first and second arms 112A, 112B. Moreover, the first arm 112A extends adjacent to and in a spaced relation from the first side 115A of the column 102 defining an opening or space disposed between the first arm 112A and the first side 115A of the column 102. Similarly, the second arm 112B extends adjacent to and in a spaced relation from the second side 115B of the column 102, defining an opening or space between the second side 115B of the column 102 and the second arm 112B. In some embodiments, bridge 112C spans or connects between arms 112A, 112B along a front and/or rear surface of the column 102.

Figure 7A:
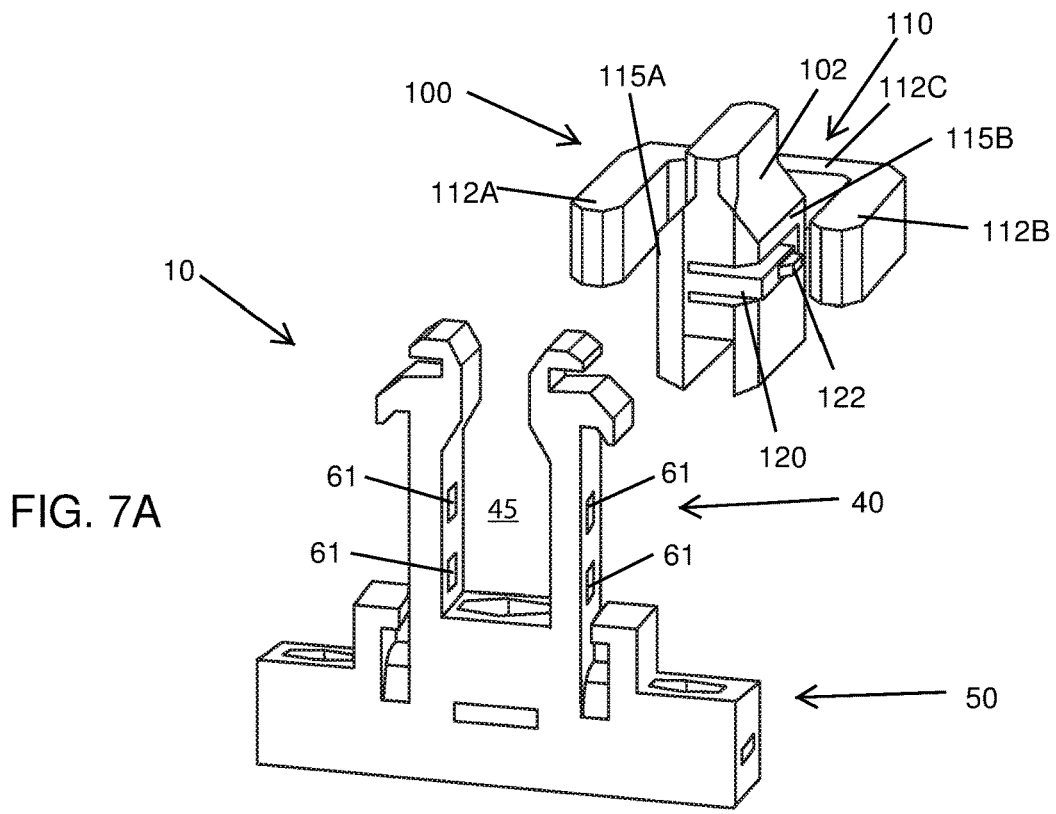
FIG. 7A is an exploded perspective view of the mounting bracket of at least one embodiment and a lock as disclosed in accordance with at least one embodiment herein.
Figure 7B:
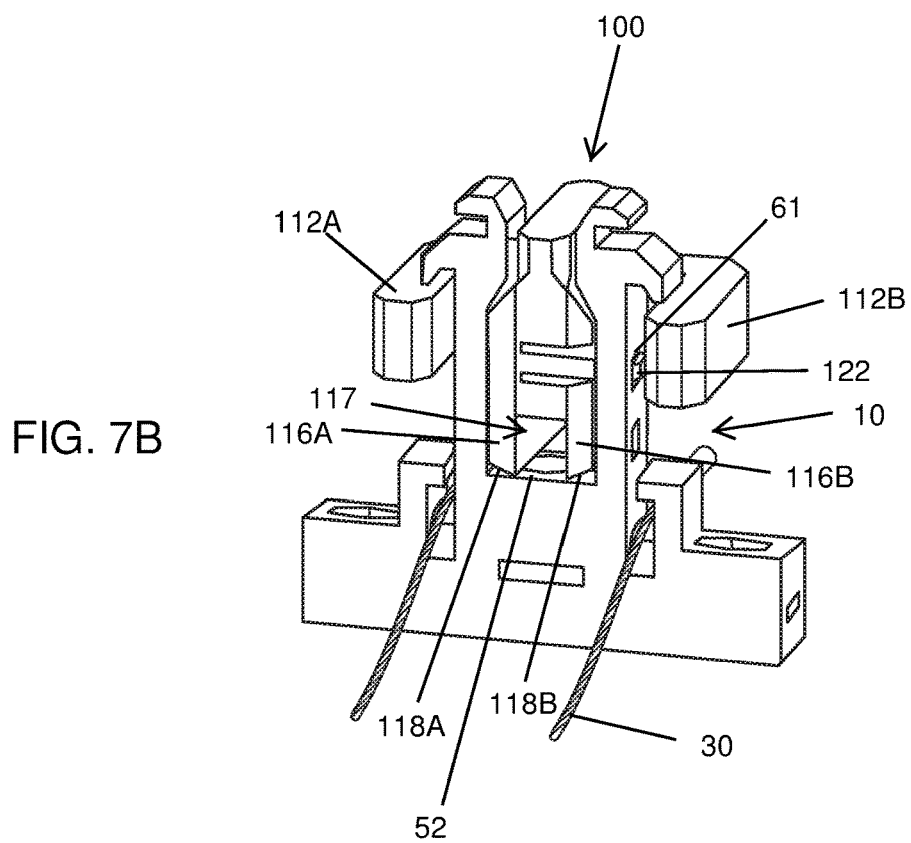
FIG. 7B is a perspective view of the mounting bracket illustrated in FIG. 7A with the lock installed into a locked engagement therewith.
Figure 7C:
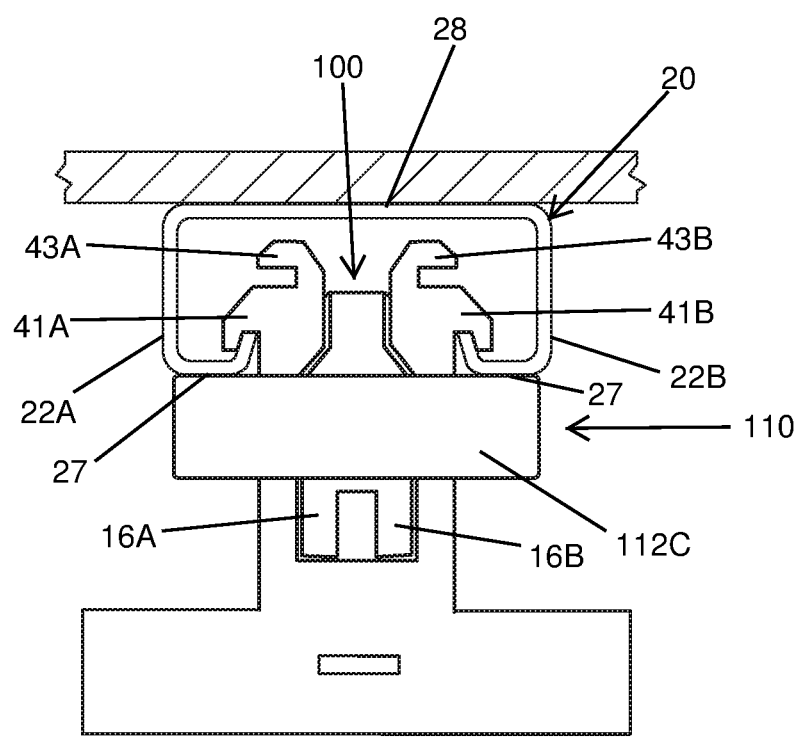
FIG. 7C is a rear elevation view of the mounting bracket of at least one embodiment and a lock of at least one embodiment.
Figure 8A:
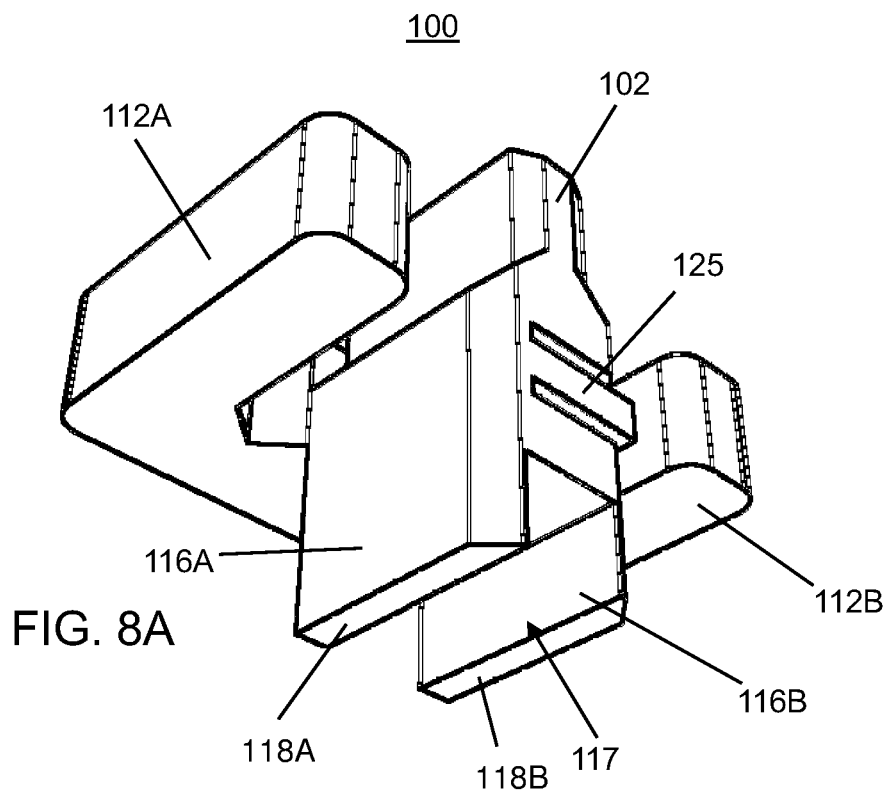
FIG. 8A is a bottom perspective view of the lock as disclosed in accordance with at least one embodiment herein.
Figure 8B:
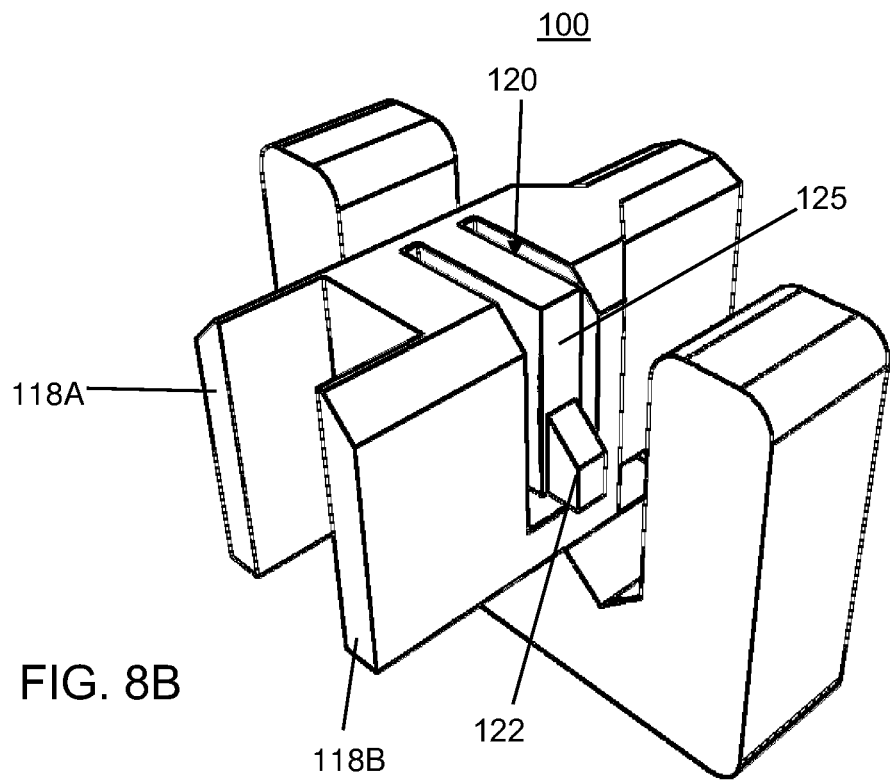
FIG. 8B is another bottom perspective view of the lock illustrated in FIG. 8A.
Figure 8C:
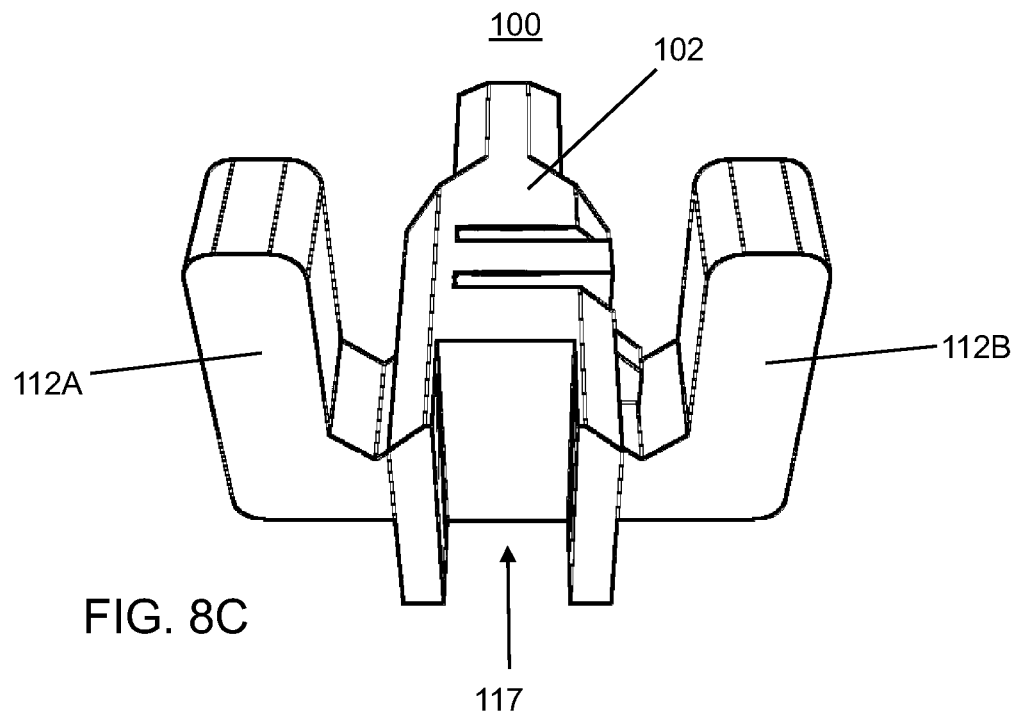
FIG. 8C is another bottom perspective view of the lock illustrated in FIGS. 8A-8B.
Figure 8D:
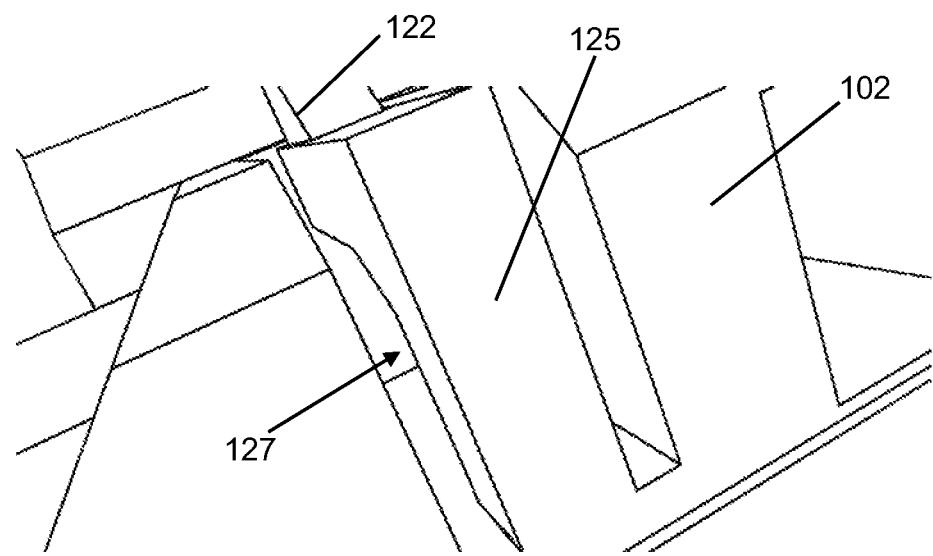
FIG. 8D is a partial detailed view of the flexible panel section and locking assembly of the lock illustrated in FIGS. 8A-8C.
Figure 8E:
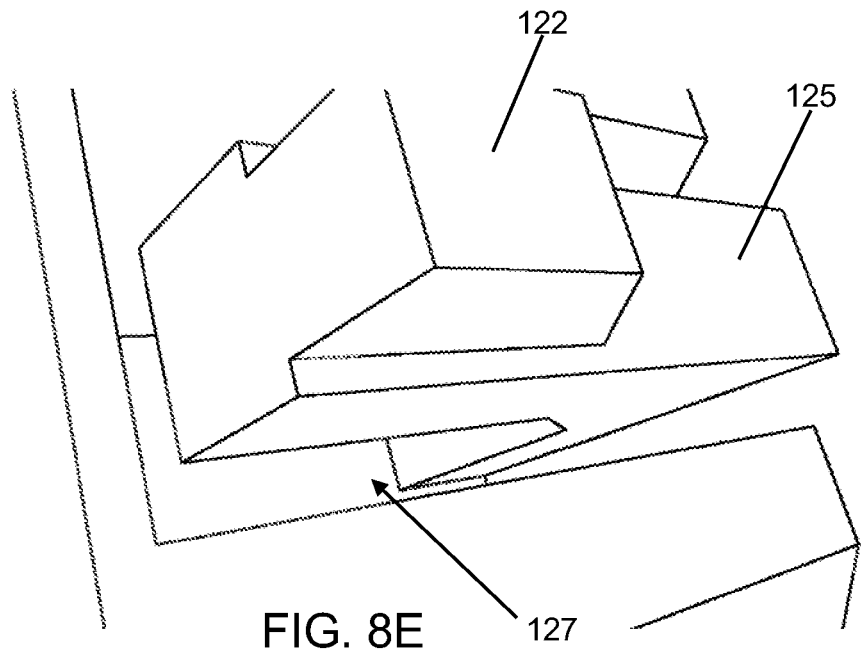
FIG. 8E is another partial detailed view of the flexible panel section and locking assembly of the lock illustrated in FIGS. 8A-8C.
Figure 8F:
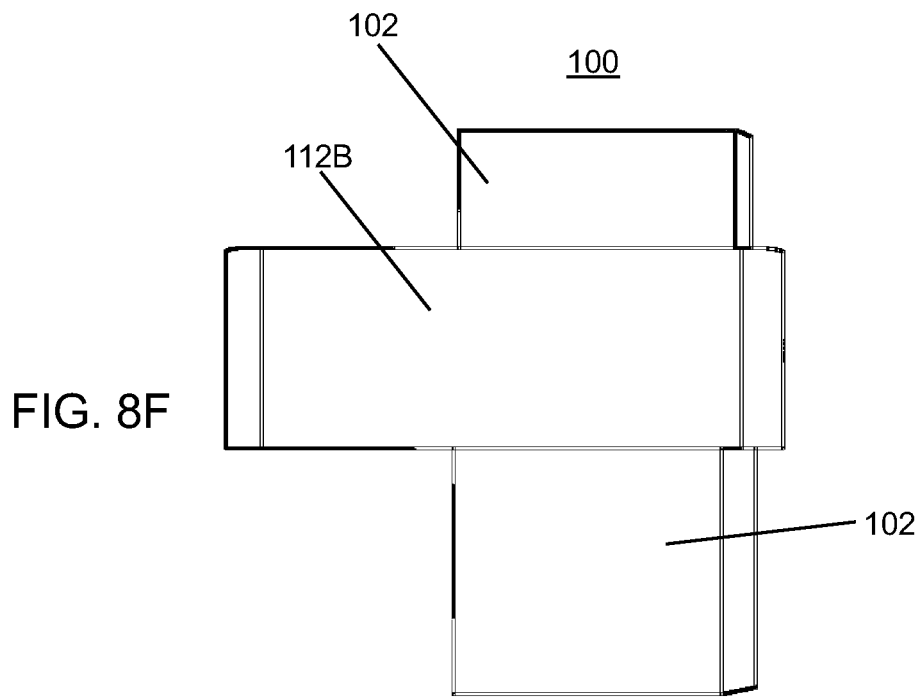
FIG. 8F is a side elevation view of the lock illustrated in FIGS. 8A-8E.
Figure 8G:
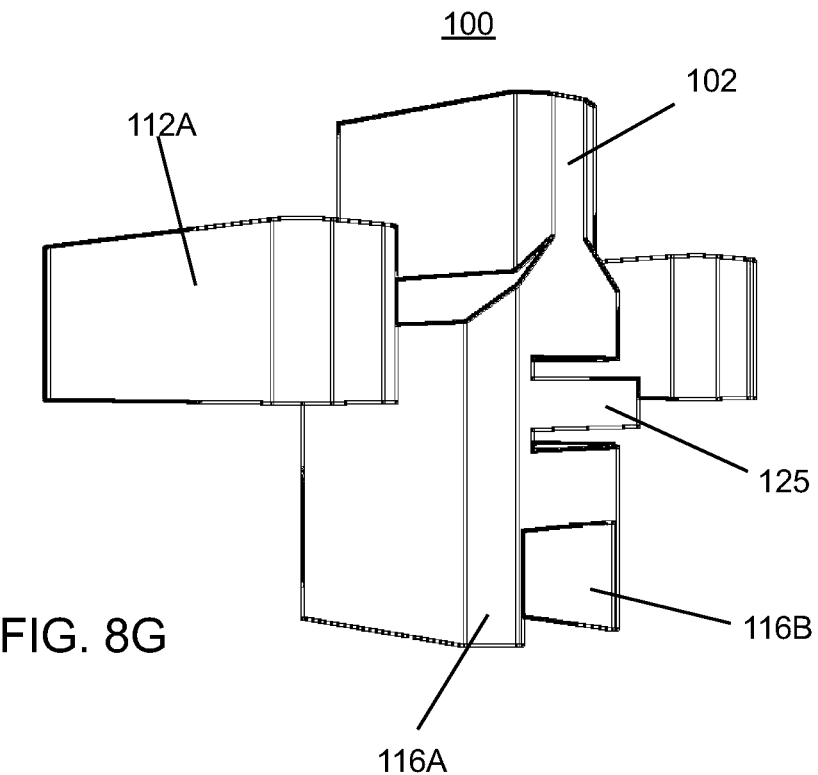
Figure 8H:
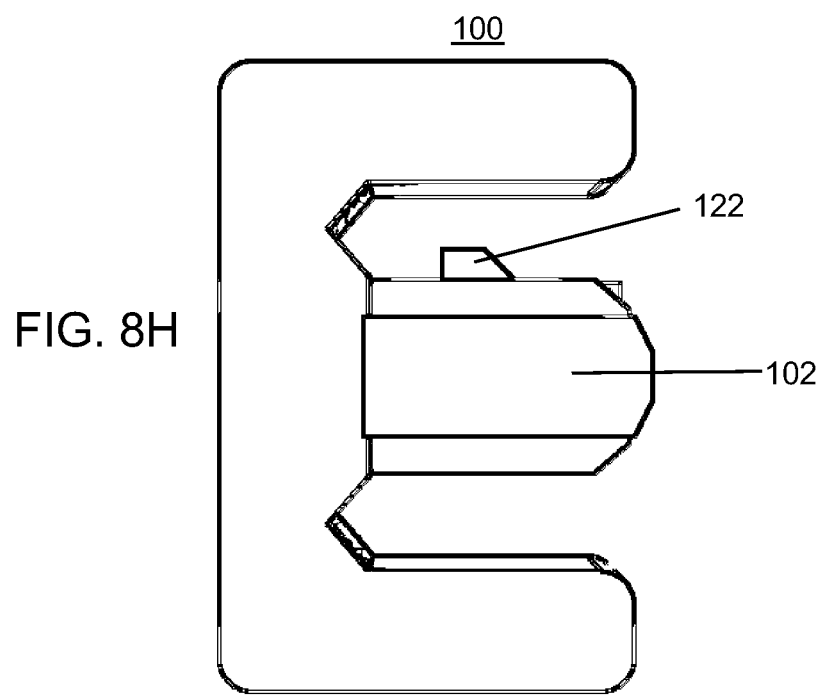
FIG. 8H is a top view of the lock illustrated in FIGS. 8A-8G.
Figure 8I:
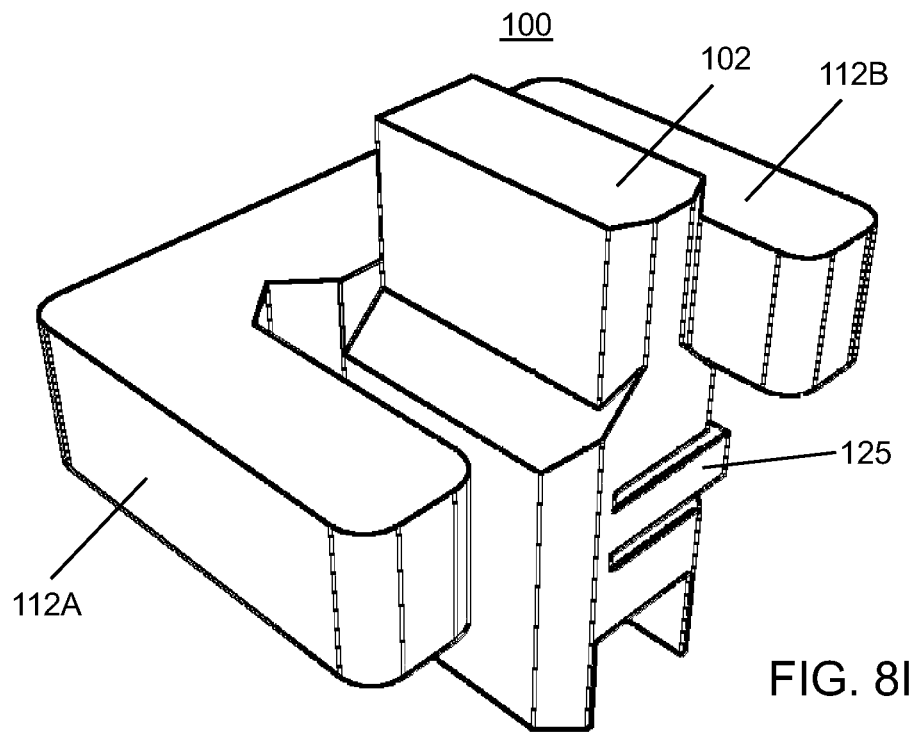
FIG. 8I is another perspective view of the lock illustrated in FIGS. 8A-8H.
Figure 8J:
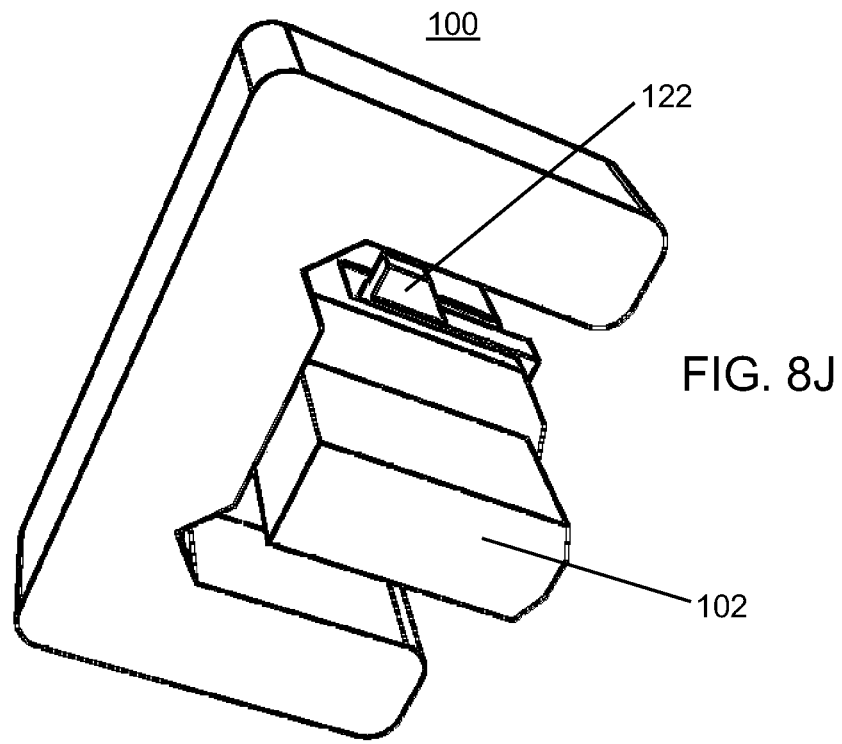
FIG. 8J is a top perspective view of the lock illustrated in FIGS. 8A-8I.

When the lock 100 is installed into a locked engagement with the bracket 10 (e.g., as shown in FIGS. 7B and 7C) the first and second arms 112A, 112B of the lock 100 will extend around the outside surface of the corresponding legs 42A, 42B, while the column 102 is disposed within the opening 45, as described above. In this manner, the arms 112A, 112B provide further resistance to an inadvertent inward flexing or bending of the legs 42A, 42B by at least partially blocking access to the legs 42A, 42B.

In addition, with reference to FIG. 7C, the outer structure 110, and in particular, 112A, 11B and 112C of the lock 100, may be disposed in an adjacent, and in some cases, a contacting or engaging relation to an outside surface 27 of the strut channel 20. This can provide additional structural support and integrity to the bracket 10, and helps maintain the bracket 10 in place, even when a heavy auxiliary structure 30 is mounted thereto.

For example, when the main opening 24 of the strut channel 20 is facing down (e.g., as shown in FIG. 7C, and the bracket 10 hangs down from the strut channel 20 via opposing flanges 41A, 41B, arms 112A, 112B (shown in FIG. 7B) and in some embodiments bridge 112C are disposed in a restricting or locking relation relative to the strut channel 20 in that the arms 112A, 112B and/or bridge 112C restrict or prevent the bracket 10 from being pushed up into the internal volume of the strut channel 20, and thus becoming loose or disengaging completely. In other words, with the lock 100 in locking engagement with the bracket 10, if an upward force is exerted upon the bracket 10, the lock 100, and in particular element 110 (e.g., arms 112A, 112B and bridge 112C) engage against or contact the outer surface 27 of the strut channel 20 thereby preventing or restricting the bracket 10 from being pushed into the internal volume of the strut channel 20.

Similarly, when the main opening 24 is facing upward (not shown, although, if FIG. 7C was rotated 180 degrees), and the bracket 10 extends upward from the main opening 24 via opposing flanges 41A, 41B, then arms 112A, 112B (shown in FIG. 7B) and in some embodiments bridge 112C, are disposed in a restricting or locking relation relative to the strut channel 20 in that the arms 112A, 112B and/or bridge 112C restrict or prevent the bracket 10 from being pushed down into the internal volume of the strut channel 20, and thus becoming loose or disengaging completely. In other words, with the lock 100 in locking engagement with the bracket 10, the lock 100, and in particular element 110 (e.g., arms 112A, 112B and bridge 112C) engage against or contact the outer surface 27 of the strut channel 20 thereby preventing or restricting the bracket 10 from dropping down into the internal volume of the strut channel 20.

Figure 10:
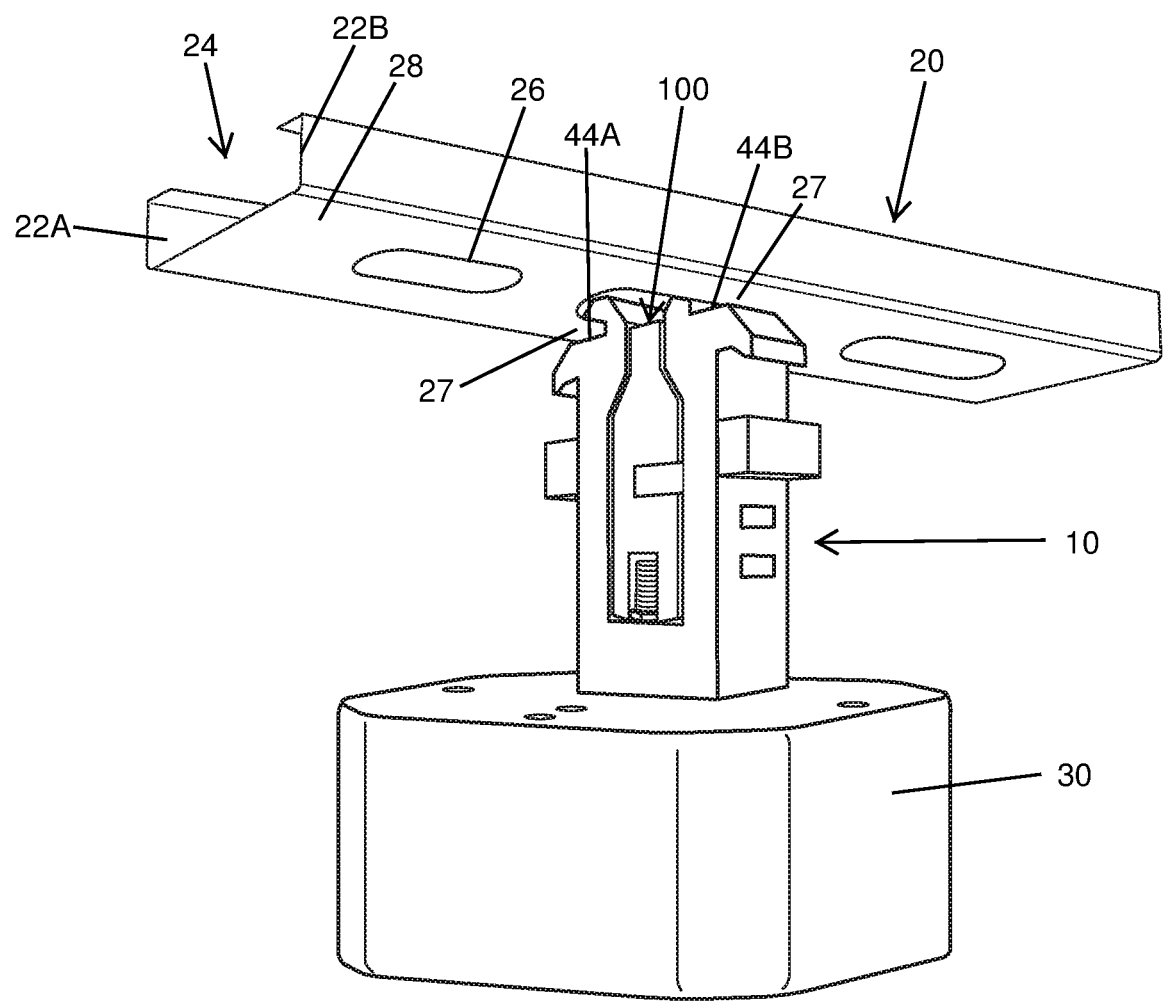
FIG. 10 is a perspective view of another embodiment of the mounting bracket attached to a strut channel and with a juncture box mounted thereto.

It should be noted that, with reference again to FIG. 2B and to FIG. 10, when the bracket 10 is connected to the strut channel 20 using the second set of opposing flanges 43A, 43B, then the surfaces 44A, 44B are disposed adjacent to, in contact with or in a restrictive or locking relation to the back panel 28 adjacent opening 26. In other words, surfaces 44A, 44B will restrict or prevent the bracket 10 from being pushed into or dropping into the internal volume of the strut channel 20 in a similar manner as element 110 (e.g., arms 112A, 112B and bridge 112C) of the lock 100, as described immediately above.

In addition, with reference to FIG. 7B, the column 102 includes a distal end, referenced as 118A and 118B, that extends to or near surface 52, defined as the inside end of opening 45. In the embodiment shown, the column 102 includes two legs 116A, 116B, each of which include a corresponding end 118A, 118B, although it should be noted that in at least one embodiment, a single surface may define the ends 118A, 118B that extends to or near surface 52. In any event, when a pressure or force is applied to the bracket 10, e.g., a pulling force pulling the bracket 10 away from strut channel 20 or a pushing force pushing the bracket into the strut channel 20, the end(s) 118A, 118B will engage or contact against the surface 52, thereby holding the bracket 10 in place. In addition, the bottom surfaces 118A, 118B of the feet 116A, 116B of at least one embodiment can be used to hold a nut 6 or other like device down or within the recess (described above) while the fastener 5 is being screwed into the nut. This allows the nut or bolt to be held in place without using a tool when a nut or bolt on the opposite end is tightened.

Further features of the lock 100 of at least one embodiment include a locking assembly or locking structure 120 which maintains the lock 100 in a locked orientation relative to the bracket 10. For example, in at least one embodiment, the locking assembly or locking structure 120 of the lock includes an extended member or knob 122 extending or protruding from a portion of the lock 100, for example, from the column 102, as shown for example at least in FIGS. 7A, 7B, 8B and 8C.

More specifically, when the column 102 of the lock 100 of at least one embodiment is disposed into the locked position, or otherwise, when the column 102 is disposed within the opening 45, the knob or other extended member 122 may snap into or fit into a corresponding hole, recess or indent 61, as shown in FIG. 7B. With the knob or extended member 122 disposed within or in a locked engagement with hole 61, the lock 100 is secured or otherwise locked in place. Removal of the lock 100 may be accomplished by pushing the knob 122 inward toward the column 102 through the hole 61, e.g., with a finger or tool, such as a screwdriver or other object, in order to release the knob 12 and the lock 100.

Specifically, in at least one embodiment, the knob or extended member 122 is disposed on a flexible, bendable or resilient section 125 of the column 102. For instance, with reference to the close-up and partial views of FIGS. 8D and 8E, the section 125 of the column has a cutout portion 127 within the body of the column which allows the section 125 to be pushed or flexed inward toward the inner column of the column 102. Movement of the section 125 inward allows the knob 122 to enter and exit the hole 61 as the lock 100 is disposed into and out of a locked engagement with the bracket 10.

It should also be noted that laterally extending holes 61 disposed on one or more of the legs 42A, 42B can be used to secure secondary or auxiliary structures to the bracket 10, for example, using one or more zip ties, string, cords, etc.

Figure 9A:
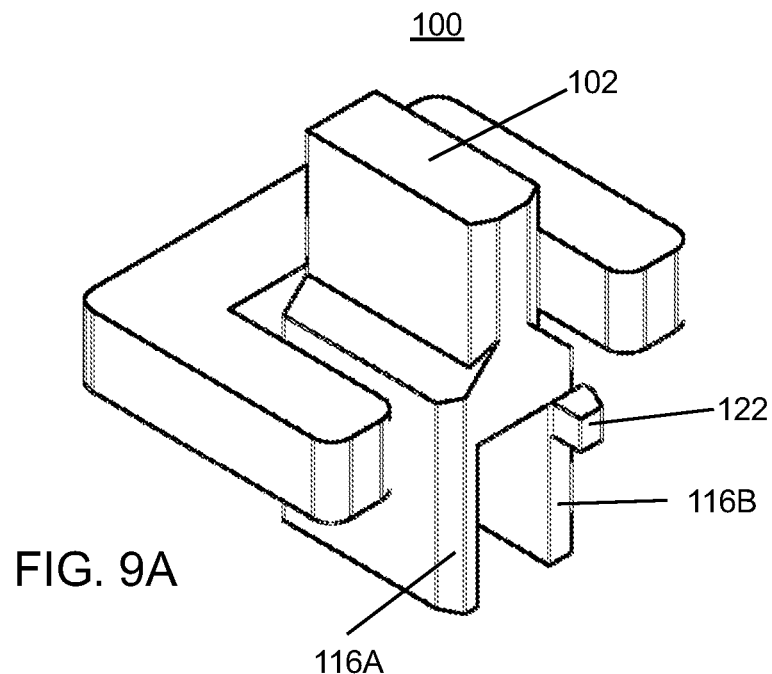
FIG. 9A is a perspective view of another embodiment of the lock as disclosed in accordance with at least one embodiment herein.
Figure 9B:
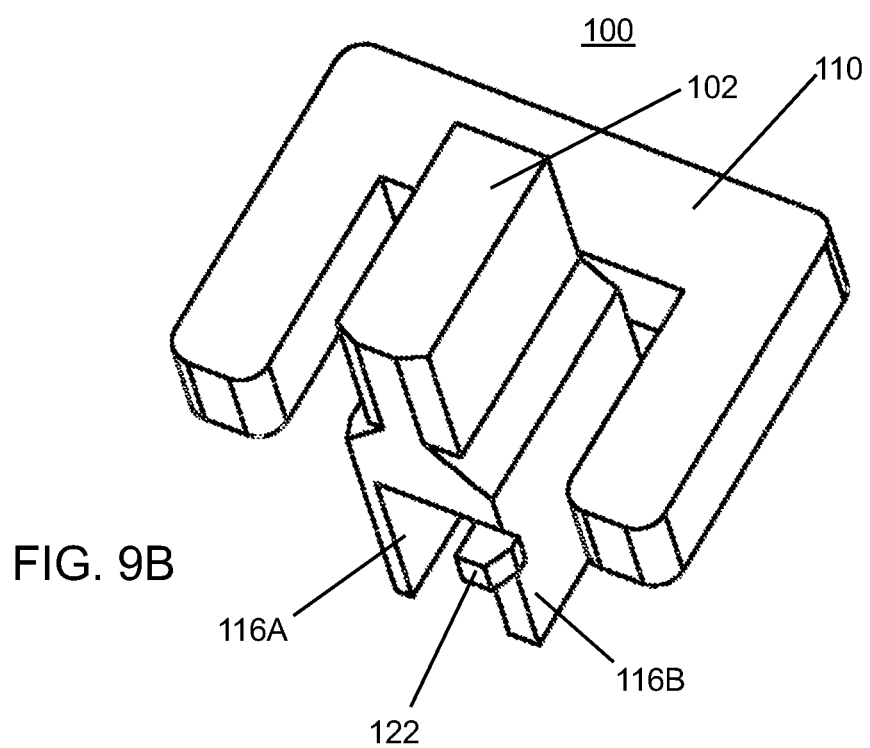
FIG. 9B is a to perspective view of the lock illustrated in FIG. 9A.
Figure 9C:
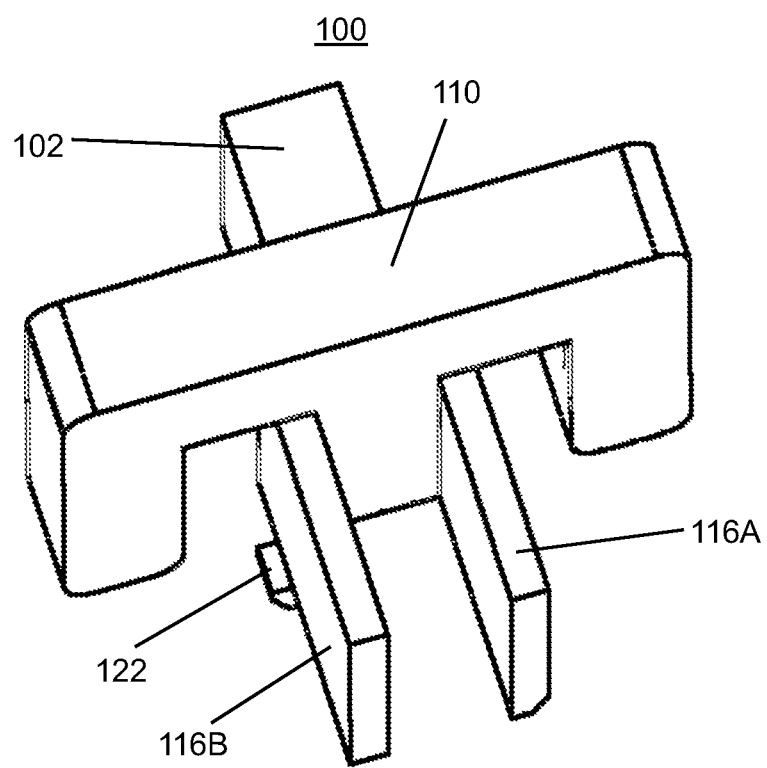
FIG. 9C is a rear perspective view of the lock illustrated in FIGS. 9A-9B.

With reference to FIGS. 9A, 9B and 9C, the knob 122 of at least one embodiment, is disposed on a front edge or surface of the column 102. In this embodiment, the knob 122 will pass through the opening 45 of the bracket 10 and wrap at least partially around the opposite outer surface of one of the legs 42A, 42B. In other words, the lock 100 may pass through the opening 45 from a rear side of the bracket 10. When doing so, the knob 122 will pass into the opening 45 from the rear side, extend through the opening 45 until it wraps about or engages a front surface of one of the legs 42A, 42B. Furthermore, in at least one embodiment, it should be noted that leg 116B may be at least partially bendable or flexible inward, e.g., toward opening 117, thereby allowing the knob to bend and flex without the cutaway portion 127 described above in connection with a different embodiment.

Still referring to FIGS. 7A through 7C, 8A through 8J and 9A through 9C, and FIG. 10, further features of the lock 100 may include opening 117 defined by spaced apart legs 116A, 116B. As best shown in FIGS. 7B and 10, with the lock 100 installed, the opening 117 defined by legs 116A, 116B can allow an end of a bolt, screw or fastener to protrude therein without being impeded or blocked by the lock 100. In other words, a fastener 5 used to mount an auxiliary structure 30 to the bracket 10 may need to pass into the opening 45 defined by the legs 42A, 42B. When that is the case, the legs 116A, 116B of the lock 100 define an opening 117 which does not block the passage of the fastener there though.

In addition, the bottom surfaces 118A, 118B of the feet 116A, 116B can be used to hold a nut 6 or other like device down or within the recess (described above) while the fastener 5 is being screwed into the nut.

FIG. 10 illustrates an embodiment or implementation wherein the bracket 10 is installed into the slots 26 disposed on the back panel 28 of the strut channel 20, and wherein the auxiliary mounting structure or section 50 includes a single longitudinal mounting component, to which a juncture box 30 is mounted. The lock 100 is in place, locking the legs 42A, 42B, while surfaces 44A, 44B provide additional locking support within the strut channel 20.

With reference now to FIGS. 11, 12A, 12B, 13A, 13B and 13C, another embodiment of the mounting bracket 200 is shown. Specifically, in this embodiment, the auxiliary mounting structure 250, and in particular, the mounting component 260 thereof, is disposed or positioned at least partially within the interior 25 of the strut channel 20 when the mounting bracket 200 is attached to the strut channel 20 in the intended manner, as shown, for example, in FIG. 12B.

An additional feature of the embodiment shown in FIGS. 11-13C is that certain portions of the mounting bracket 200 may be flexible or resilient allowing the mounting bracket 200 to be easily engaged or attached to the strut channel 20, and removed from the strut channel 20. As will be described herein, in at least one embodiment, one or more legs 242A, 242B and/or one or more connection arms 244A, 244B may be at least partially resilient, flexible or bendable, which allows corresponding clips 240A, 240B to at least partially flex inward (e.g., toward longitudinal axis A) and outward (e.g., away from longitudinal axis A).

In certain embodiments, the material from which the mounting bracket 200 is made, as well as the thickness or thickness uniformity of certain portions of the bracket 200 (e.g., the legs 242A, 242B and/or connection arms 244A, 244B) can allow the portions to bend or flex, as described herein. The type of material chosen may drive the values of the other factors (e.g., thickness, thickness uniformity, length, etc.) to allow certain portions to bend or flex. As just an example, Polyethylene Terepthalate Glycol Modified (PETG) may be used for 3D printing the mounting bracket 200. As another example, a combination of glass fiber nylon and glass fiber polypropylene can be used for producing the mounting bracket 200 via injection molding.

In the embodiment shown, the mounting structure 250 or mounting component 260 thereof is semicircular in shape with an opening, for example, at the top. In this manner, the mounting component 260 may include a "U" shaped cross-sectional clip for attaching or securing an auxiliary structure 30 therein. More specifically, the mounting component 260 of at least one embodiment allows an auxiliary structure 30 with a circular cross section, such as a conduit, pipe, tube, channel, etc., to be easily secured or snapped into place, e.g., within the mounting component 260. With the conduit or other structure 30 mounted or secured to the bracket 200, the bracket 200 can then be attached to the strut channel 20, for example, via attachment structure 240. A conduit, as used herein, may be a tube, pipe, channel or other like structure that can be used to retain or protect electrical wires, fluids, gasses, etc. Of course, however, other auxiliary structures 30 may be mounted to the bracket 200, including pipes, wires, tubes, etc. It should also be noted that, although the embodiment shown in FIGS. 11 through 13C show a mounting component 260 with a circular or semicircular shape, e.g., a "U" shape, other configurations and shapes, including cross sections having a square, rectangular, triangular, or other shape with a similar opening are contemplated, and that the mounting component 260 can be used to retain auxiliary structures of virtually any shape.

Still referring to FIGS. 11 through 13C, the auxiliary mounting structure 250 of at least one embodiment also includes body 255 to which the structural mounting component 260 may be attached at one end. The body 255 may be a column or extension piece that is narrow enough to fit at least partially within the strut channel 20 or otherwise to extend the mounting component 260 at least partially into the strut channel 20.

Furthermore, the attachment structure 240 of at least one embodiment includes at least one, but more practically two clips, such as a first clip 240A and second clip 240B. The clips 240A, 240B are structured to attach to the strut channel 20, for example, to opposing sides or ends of the strut channel 20, as described and shown herein. In certain embodiments, the attachment structure 240 also includes one or more legs 242A, 242B to which the corresponding clips 240A, 240B are attached.

Figure 13A:
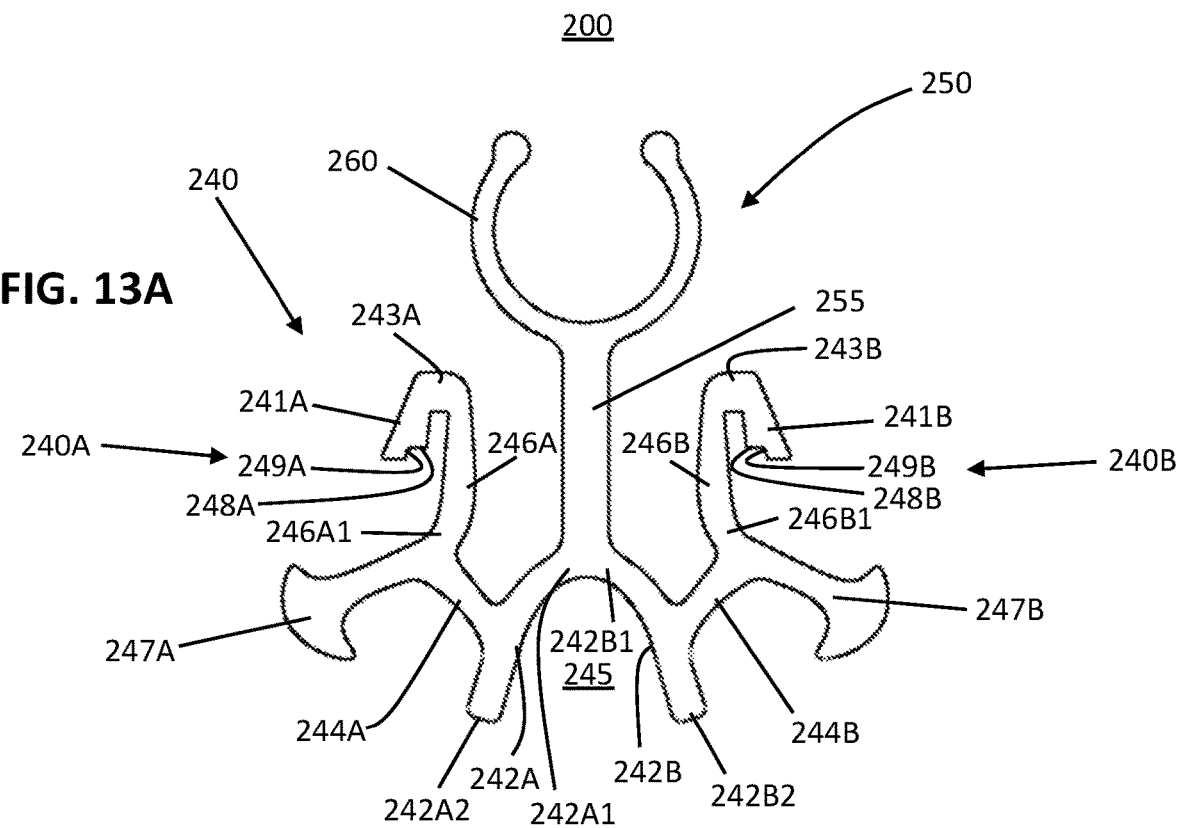
FIG. 13A is a front view of the mounting bracket illustrated in FIGS. 12A and 12B.
Figure 13B:
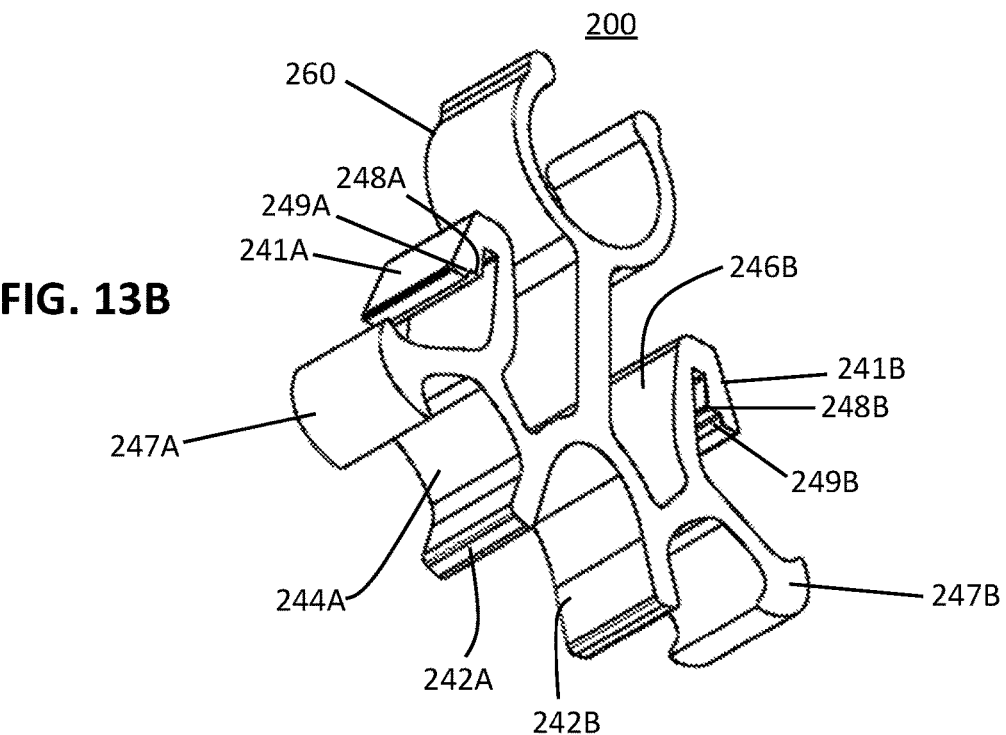
FIG. 13B is a perspective view the mounting bracket illustrated in FIG. 13A.
Figure 13C:
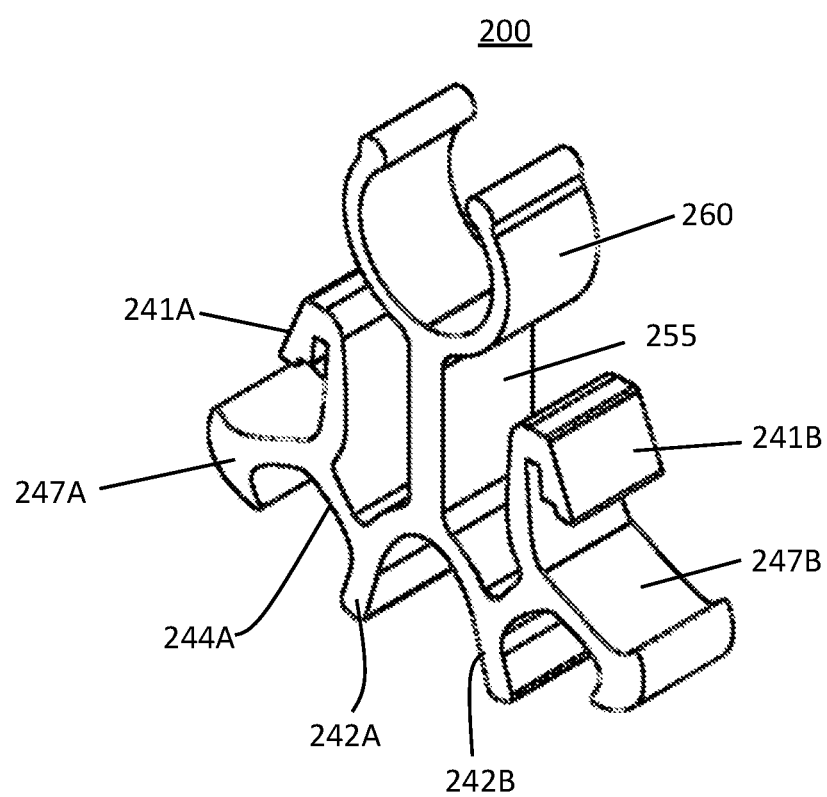
FIG. 13C is another perspective view of the mounting bracket illustrated in FIG. 13A.

For instance, with reference to FIG. 13A, the legs 242A, 242B of at least one embodiment extend downward or away from the body 255 of mounting structure 250, and at opposing angles defining a space or opening 245 there between. More specifically, legs 242A, 242B include a proximal end 242A1, 242B1 and distal end 242A2, 242B2. The proximal ends 242A1, 242B1 are defined as being attached to the mounting structure 250 or body 255 thereof, whereas the distal ends 242A2, 242B2 are defined as being opposite from the corresponding proximal ends. As will be described again below, in at least one embodiment, the legs 242A, 242B can be flexed or at least partially bent inward toward opening 245 when a squeezing force or inward force is applied to the outside surfaces thereof. For example, a squeezing force can be applied to the outside surfaces of the legs 242A, 242B at or near the distal ends 242A2, 242B2 thereof. This squeezing force will then cause the respective clips 240A, 240B to move, for example, in an outward direction. In some cases, the legs 242A, 242B are resilient such that when the squeezing force is released, the legs 242A, 242B will return to the original position.

Accordingly, the legs 242A, 242B can be constructed in a manner that will allow them to be partially flexed or bent. In some cases, the legs are constructed of a plastic material and have a thickness that allows them to be resilient, flexible or bendable.

Still referring to FIG. 13A, the clips 240A, 240B of at least one embodiment are defined as including attachment arms 246A, 246B and flanges 241A, 241B. In the embodiment shown, a shoulder 243A, 243B extends from one end of the corresponding attachment arms 246A, 246B, and the flanges 241A, 241B extend from an end of the shoulders 243A, 243B. In particular, the attachment arms 246A, 246B, shoulders 243A, 243B and flanges 241A, 241B define a "U" shaped opening (which in the orientation shown in FIG. 13A is an upside down "U" shape). In this manner, the flanges 241A, 241B can bend or flex outward away from a corresponding arm 246A, 246B in order for the mounting bracket 200 to clip or engage to strut channels constructed of a thicker gauge.

In particular, it should also be noted that different strut channels 20 can be constructed using different sized pieces of metal, or otherwise metal with different thicknesses or different gauges. In at least one embodiment, the flanges 241A, 241B can flex or bend at least partially outward, for example, via shoulder 243A, 243B, thereby increasing or expanding the size of the opening between the flange 241A, 241B and the corresponding attachment arm 246A, 246B. As just an example, the mounting bracket 200 may be constructed out of a plastic material and the shoulder 243A, 243B may be formed in a manner such that flanges 241A, 241B are at least partially resilient or otherwise can flexed outward and away from the corresponding attachment arm 246A, 246B. For instance, in one embodiment, the thickness of the shoulder 243A, 243 may be formed such that the flanges 241A, 241B can flex or bend. In any event, the outward flexing or bending of the flange 241A, 241B can allow a single mounting bracket 200 to easily attach to different strut channels 20 that have different thicknesses or gauges, or that otherwise haves inside edges 22A, 22B with different thicknesses.

Figure 11:
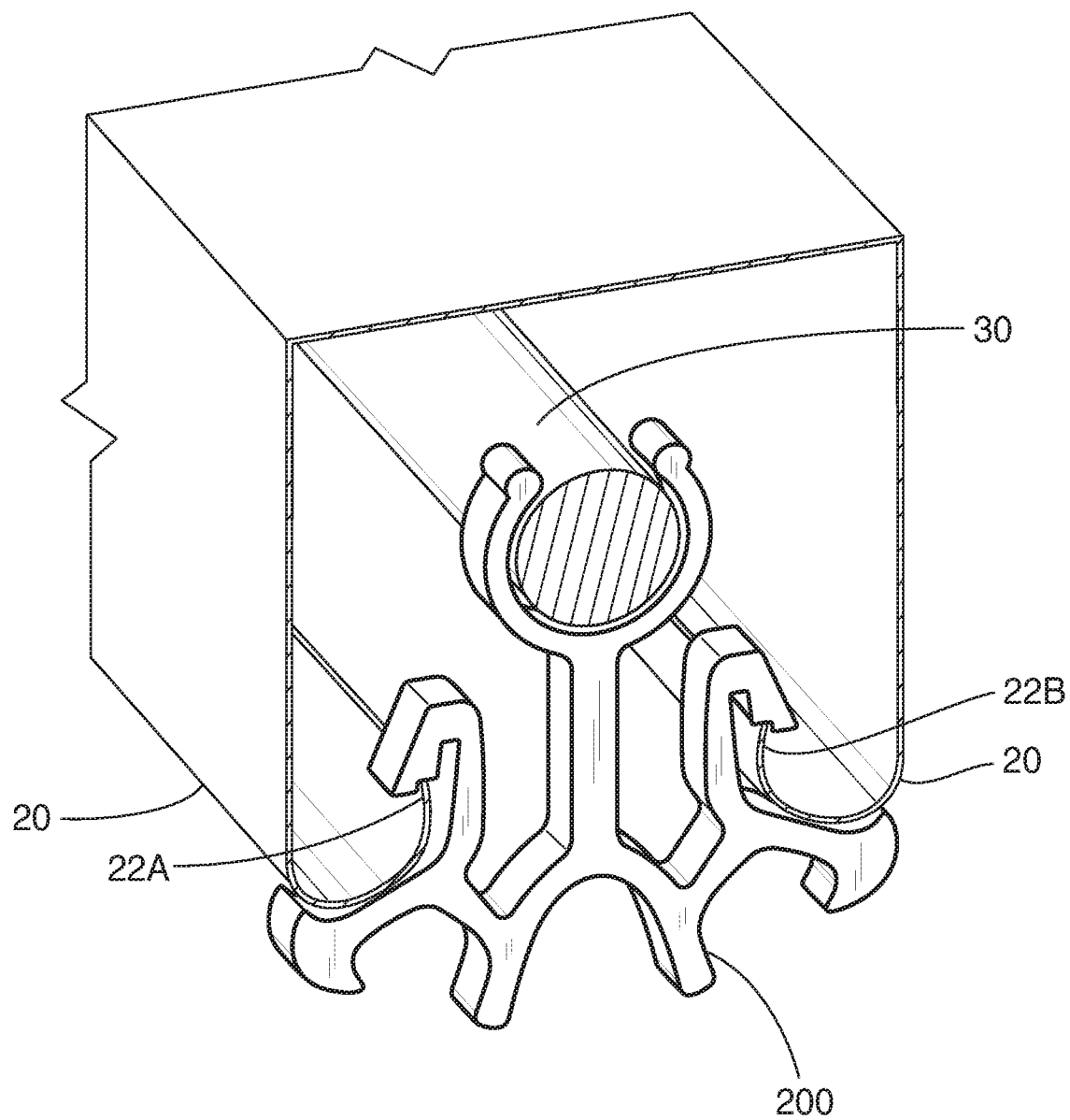
FIG. 11 is a perspective view of the mounting bracket of yet another embodiment installed within a strut channel.
Figure 12A:
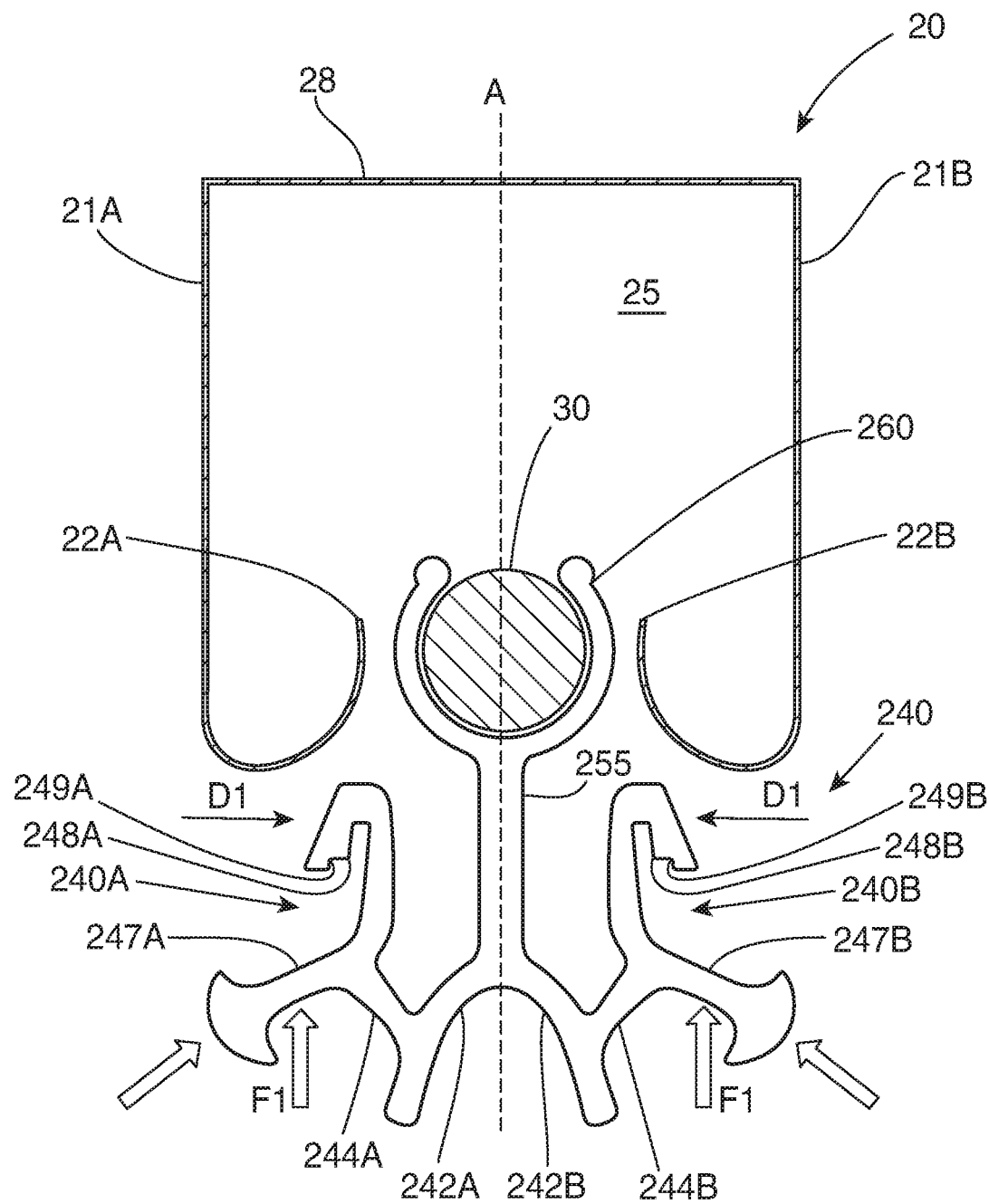
FIGS. 12A and 12B are end views illustrating the mounting bracket being installed within a strut channel.
Figure 12B:
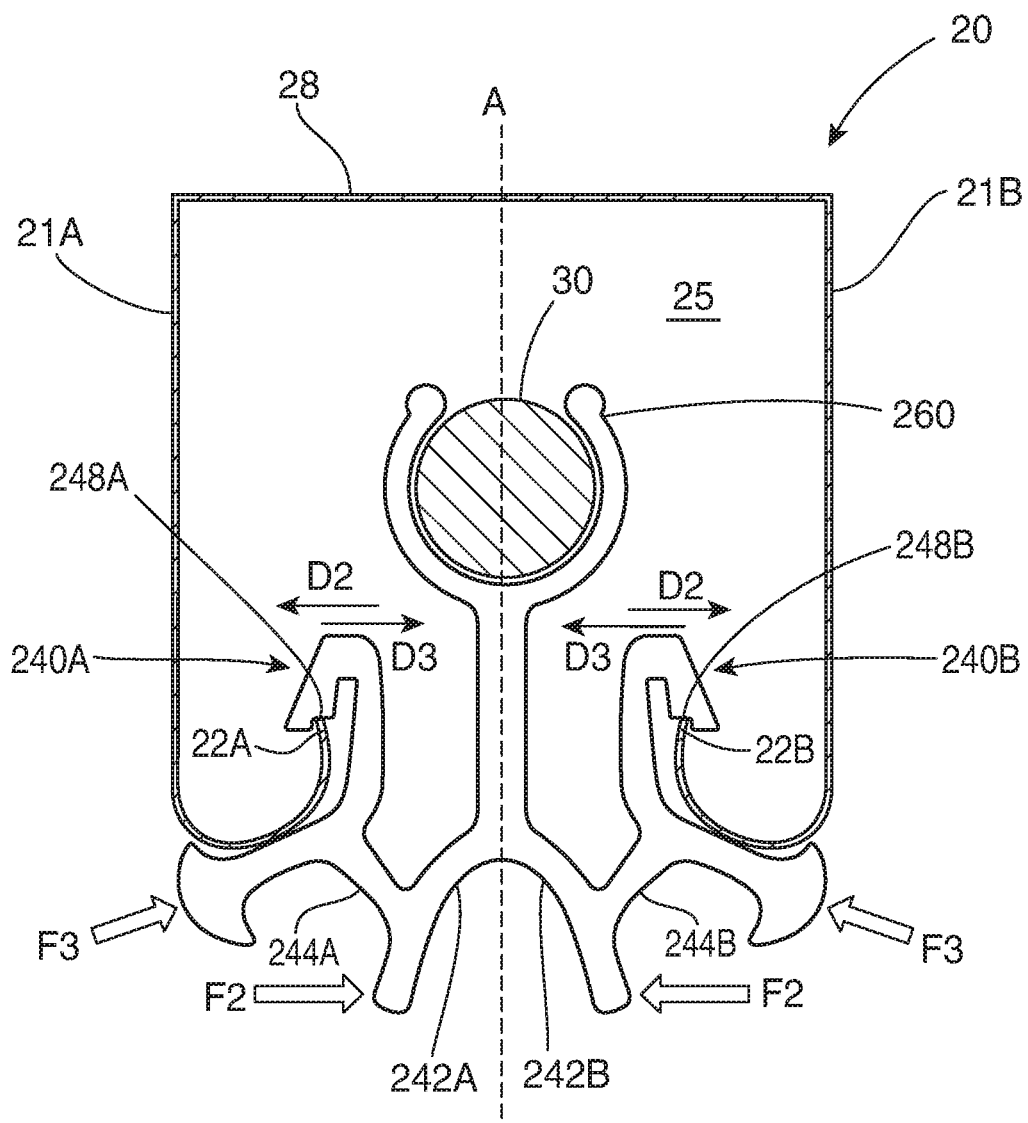

Furthermore, with reference to FIGS. 11, 12A and 12B, the flanges 241A, 241B of at least one embodiment include or define a ledge 284A, 248B upon which a portion of the struct channel 20 can be seated when the mounting bracket 200 is attached to the struct channel 20. More specifically, many strut channels 20 include opposing inside edges 22A, 22B that are oriented into or toward the inside 25 of the strut channel 20. The opposing inside edges 22A, 22B extend longitudinally along the length of the entire or substantially the entire strut channel 20. As shown in FIGS. 11 and 12B, in at least one embodiment, the inside edges 22A, 22B of the strut channel can be seated upon the corresponding ledge 248A, 248B at the end of the flange 241A, 241B or otherwise defined as part of the opposing flanges 241A, 241B.

Additionally, a lip 249A, 249B may be disposed at least partially, although in some cases completely along an outside edge of the corresponding ledges 248A, 248B. The lip 249A, 249B may act as a stopper to engage the inside edges 22A, 22B of the strut channel 20 and to ensure a tight and secure fit of the mounting bracket 200 thereto.

Moreover, the clips 240A, 240B of at least one embodiment may be attached to corresponding legs 242A, 242B via connection arms, such as a first connection arm 244A and a second connection arm 244B. In one embodiment, the clips 240A, 240B, and in particular, the connection arms 244A, 24B are attached to the legs 242A, 242B between the proximal end 242A1, 242B1 and the distal end 242A2, 242B2 thereof. In other words, the clips 240A, 240B may be offset from the distal end 242A2, 242B2 of the legs 242A, 242B leaving a portion of the legs extending past the joint where the clips 240A, 240B are attached. This portion can be used to apply a squeezing or inward force to the legs 242A, 242B, as described herein.

In some embodiments, the connection arms 244A, 244B may be at least partially resilient, flexible or bendable, causing the corresponding clips 240A, 240B to at least partially move upon application of a force thereto. Accordingly, the connection arms 244A, 244B can be constructed in a manner that will allow them to be partially flexed or bent. In some cases, the connection arms 244A, 244B are constructed of a plastic material and have a thickness that allows them to be resilient, flexible or bendable.

For example, each of the clips 240A, 240B may include an extension portion 247A, 247B that can be used to apply a force causing the clips 240A, 240B to move, as described herein. For instance, the extension portions 247A, 247B may extend from or near the joint where the attachment arm 246A, 246B meets the connection arm 244A, 244B. In other words, attachment arm 246A, 246B may be defined as including the flanges 241A, 241B and/or shoulders 243A, 243B at a distal end, and an extension portion 247A, 247B at or near an opposite proximal end 246A1, 246B1. In some embodiments, the extension 247A, 247B may include a knob, lever or enlarged end. Pushing on the extension 247A, 247B causes the corresponding clip 240A, 240B to move, bend or flex, for example, via flexing or bending of connection arm 244A, 244B and/or leg 242A, 242B.

More specifically, with reference now to FIG. 12A, in order to attach the mounting bracket 200 of at least one embodiment to the strut channel 20, a user may apply a pushing force F1 to the bracket 200, for example, to clips 240A, 240B or to extensions 247A, 247B. This force F1 can be considered an inward and/or upward force exerted upon the clips 240A, 240B toward the strut channel 20. The force F1 causes the clips 240A, 240B to flex, bend or move inward (e.g., toward the body 255 or mounting structure 250) in direction D1 until the clips pop into the strut channel 20. For instance, force F1 causes the legs 242A, 242B and/or the connection arms 244A, 244B to bend or flex, causing the corresponding clips 240A, 240B to move inward in direction D1. For example, upon application of force F1, the legs 242A, 242B may resiliently bend or flex outward away from one another (e.g., at or near proximal ends 242A1, 242B1, causing the opening defined as being disposed between the legs 242A, 242B to enlarge). Moreover, upon application of force F1, the connection arms 244A, 244B may resiliently bend or flex toward each other or inward causing the clips 240A, 240B to move inward. The inward movement of clips 240A, 240B allows the clips 240A, 240B to clear or pass between the inside edges 22A, 22B of the strut channel 20.

The force F1 can also be considered a pushing force upon the entire bracket 200 into or toward the strut channel 20. In other words, a single upward force F1 can be applied to the extensions 247A, 247B which simultaneously causes the clips to move inward and causes the bracket 200 to be pushed into the strut channel, as shown in FIGS. 12A and 12B.

In some cases, force F1 causes the clips 240A, 240B to contact the outer surface of the strut channel 20, which can also assist with the inward bending or flexing of the clips 240A, 240B. For instance, the curved top surface of the clips 240A, 240B, e.g., at shoulders 243A, 243B and/or the curved undersurface of the struct channels 20 to which the clips 240A, 240B or shoulders 243A, 243B may engage, can facilitate the inward bending or flexing of the clips 240A, 240B needed for the clips to be disposed within the strut channel 20.

Then, as shown in FIG. 12B, an inward or squeezing force F2 can simultaneously be applied to the ends of the legs 242A, 242B, causing the clips 240A, 240B to move in outward directions D2. This force F2 can thus allow or ensure that the clips 240A, 240B are securely attached to or otherwise fully engaged with the corresponding edges 22A, 22B of the strut channel 20. More specifically, the inward or squeezing force F2 causes the legs 242A, 242B to resiliently flex or bend inward, e.g., at or near proximal ends 242A1, 242B1, which in turn, causes the clips 240A, 240B to move outward, for example, in direction D2, toward the edges 22A, 22B.

Still referring to FIG. 12B, removal of the bracket 200 from the strut channel 20 can be accomplished by applying a force F3 to either one or both of the extensions 247A, 247B. The force F3 can be considered an inwardly directed force upon the corresponding clip(s) 240A, 240B causing the clip(s) 240A, 240B flex or bend inward, e.g., in direction D3. More specifically, force F3 causes either the corresponding leg(s) 242A, 242B and/or the corresponding connection arm(s) 244A, 244B to resiliently bend or flex, which correspondingly causes the clip(s) 240A, 240B to bend or flex. For example, force F3 may cause the connection arms 244A, 244B to resiliently bend or flex inward toward each other, causing the clips or flanges to move in direction D3. This will cause the clip(s) 240A, 240B to be dislodged from the rail or edge 22A, 22B. Once at least one of the clips 240A, 240B is dislodged, a pulling force can be applied upon the bracket in a direction away from the strut channel to completely free the clip(s) 240A, 240B therefrom. It should also be noted that the clips 240A, 240B can be removed in this manner simultaneously, or one at a time.

Figure 14:
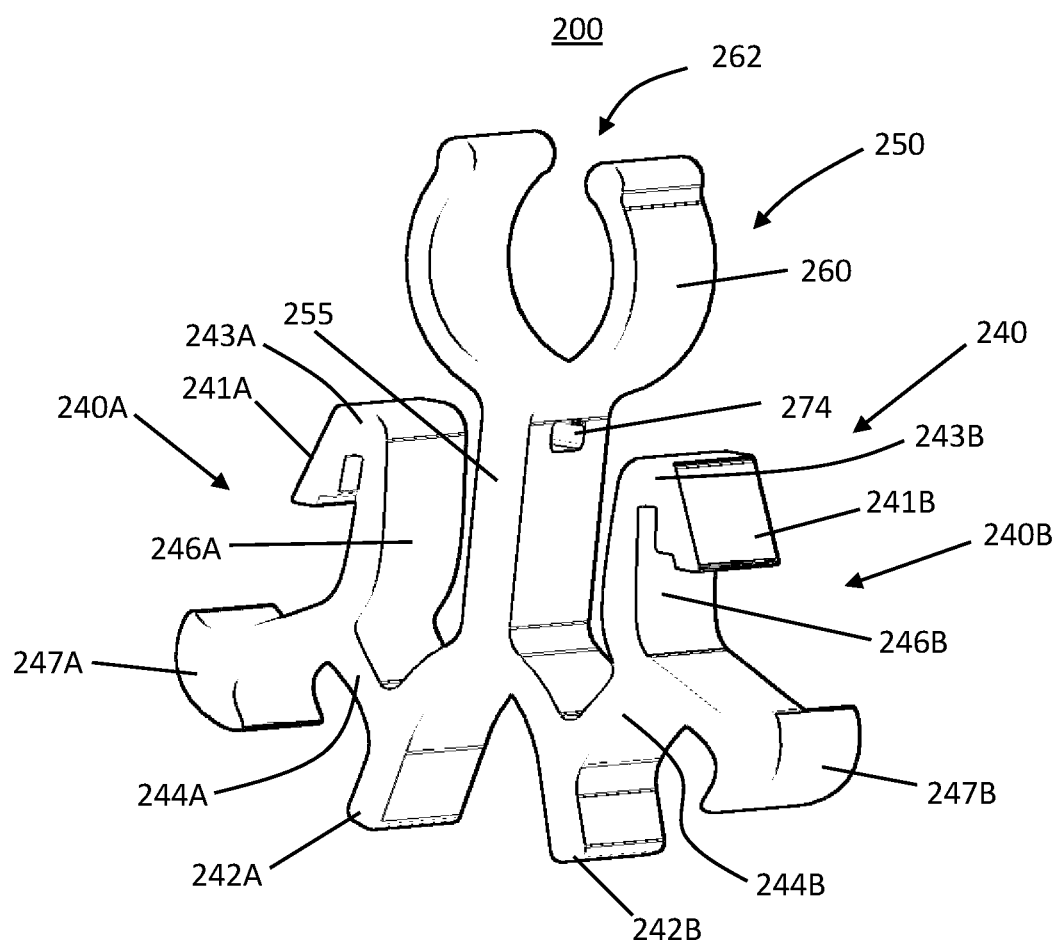
FIG. 14 is a perspective view of another embodiment of the mounting bracket as disclosed herein.

With reference now to FIG. 14, in at least one embodiment, a channel or slot 274 may be formed entirely through a portion of the bracket 200, for example, through the body 255. In this manner, a zip tie, rope, string, or other securing device can be threaded through the slot 274, which can then be used to secure around the mounting component 260 and over the opening 262 thereof. In particular, although the mounting component 260 or "U" shaped clip thereof can secure the conduit or other auxiliary structure 30 therein, the zip tie or other securing device can be used to further secure the auxiliary structure 30 in place.

Figure 15A:
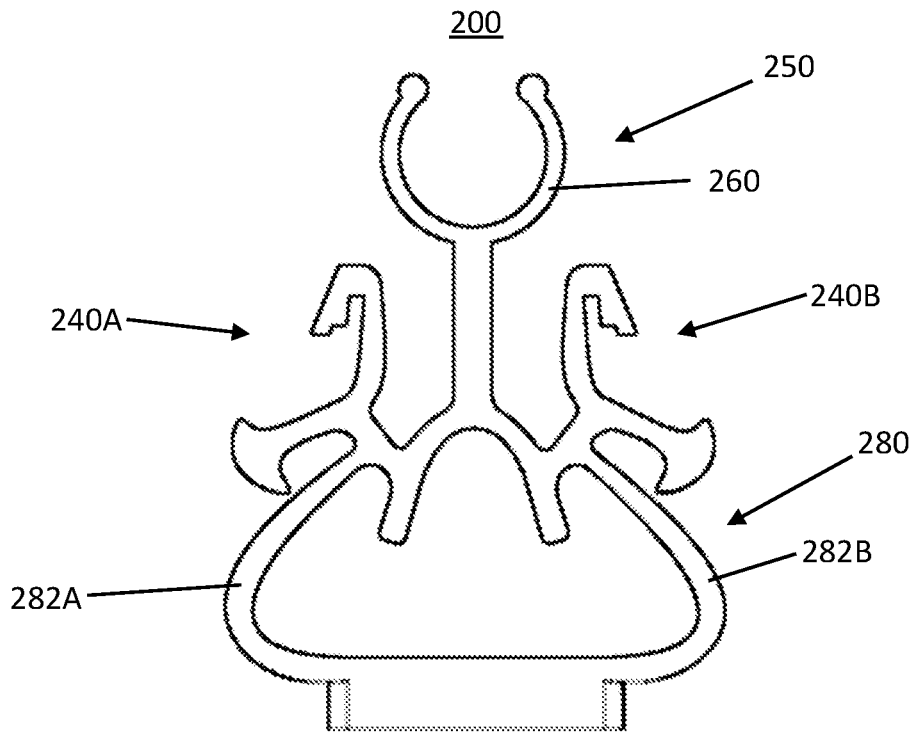
FIG. 15A is a perspective view of yet another embodiment of the mounting bracket as disclosed herein.
Figure 15B:
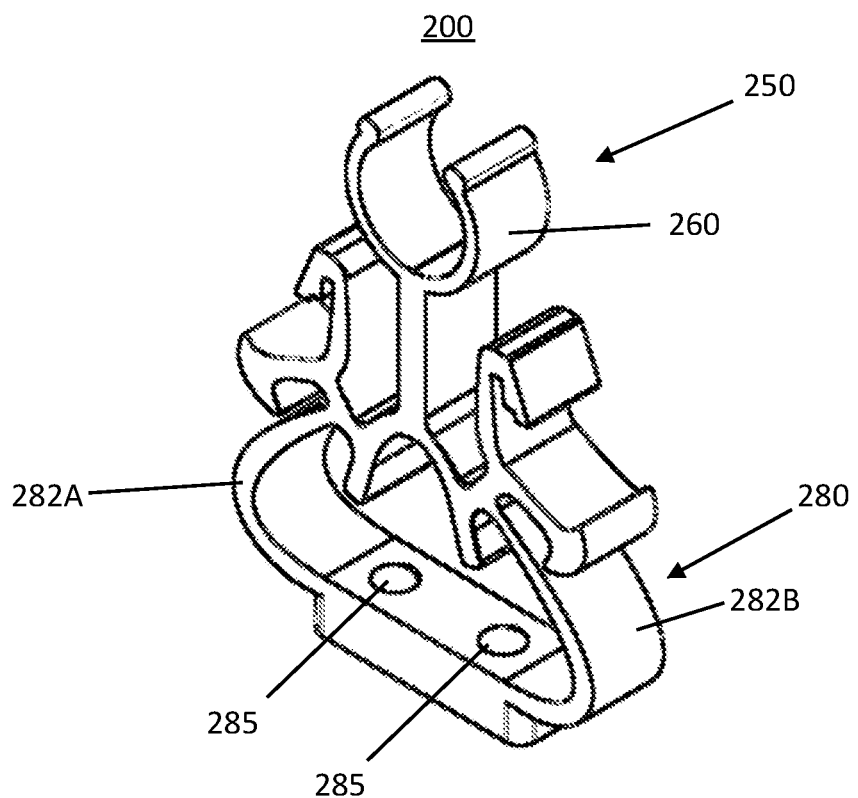
FIG. 15B is a perspective view of the mounting bracket illustrated in FIG. 15A.
Figure 15C:
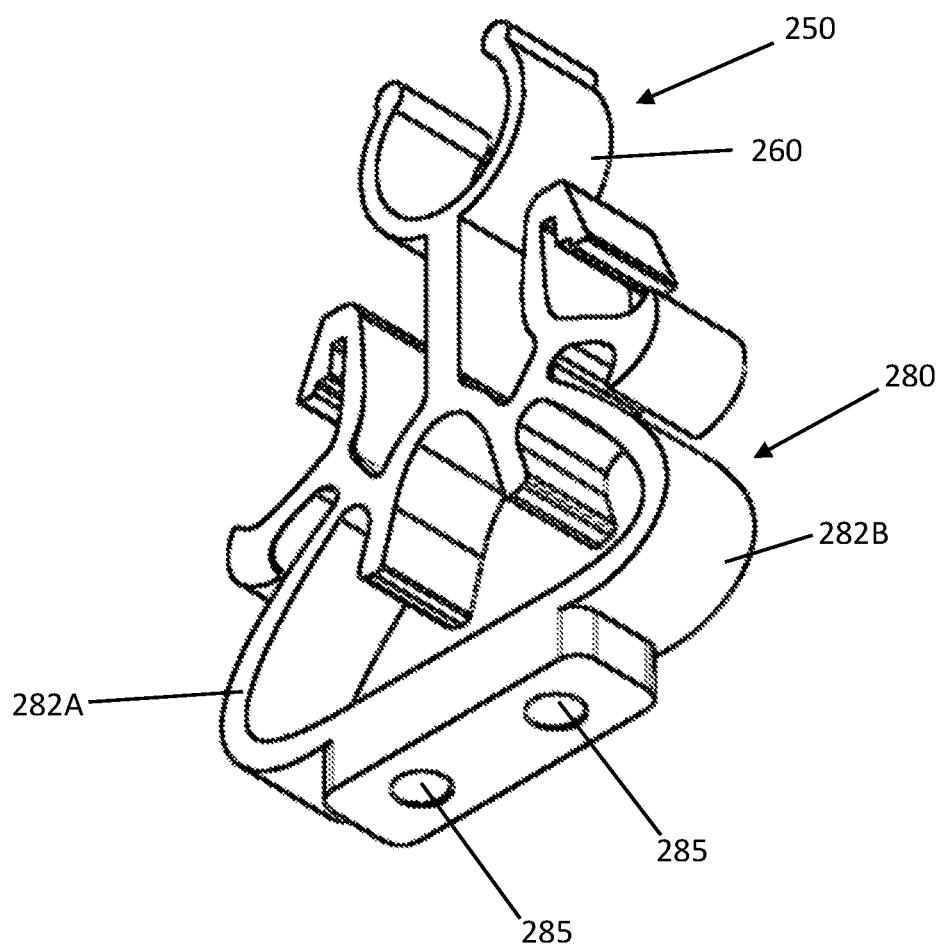
FIG. 15C is another perspective view of the mounting bracket illustrated in FIG. 15A.

FIGS. 15A, 15B and 15C illustrate yet another embodiment of the present invention. In this embodiment, an additional mounting structure 280 is shown as extending from a bottom end of the bracket 200 or otherwise end opposite from the mounting component 60. In this manner, when the bracket shown in FIGS. 15A, 15B and 15C is attached to a strut channel, mounting component 260 is disposed at least partially, and in some cases completely, within the strut channel, whereas mounting structure 280 will be disposed external to the strut channel. The additional mounting structure 280 can be constructed in many different forms, and can include a plurality of different mounting components such as holes 285, channels, clips, etc. As just an example, in the embodiment shown, holes 285 pass through the mounting structure 280 allowing one or more screws, bolts, or other fasteners to be disposed there through. This allows additional auxiliary structures, such as LED or light fixture, pipes, tubes, cables, conduits, etc. to be attached thereto.

Still referring to FIGS. 15A, 15B and 15C, extension arms 282A, 282B extend from connection arms 244A, 244B to define at least part of the additional mounting structure 280. It should be noted that extension arms 282A, 282B can, in other embodiments, extend from other portions of the bracket 200, including, for example, body 255, legs 242A, 242B, etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A mounting bracket for attachment to a strut channel, said mounting bracket comprising:
    an attachment structure and an auxiliary mounting structure,
    said auxiliary mounting structure comprising a body and at least one structural mounting component,
    said attachment structure comprising a first clip and a second clip, wherein said first clip is attached to a first leg and said second clip is attached to a second leg, said first leg and said second leg extending from said body of said auxiliary mounting structure,
    said first clip comprising a first attachment arm and a first flange,
    said second clip comprising a second attachment arm and a second flange,
    wherein said first leg is at least partially flexible relative to said body of said auxiliary mounting structure and wherein said second leg is at least partially flexible relative to said body of said auxiliary mounting structure,
    wherein said at least one structural mounting component is disposed at least partially within an interior area of the strut channel when said mounting bracket is attached to the strut channel, and
    wherein said at least one structural mounting component comprises a semicircular configuration adapted to retain a conduit therein.

2. The mounting bracket as recited in claim 1 wherein said first clip and said second clip are structured to at least partially move in opposing outward directions when an inward squeezing force is simultaneously applied to said first leg and said second leg.

3. The mounting bracket as recited in claim 2 wherein said first leg comprises a proximal end and a distal end, said proximal end of said first leg being attached to said body of said auxiliary mounting structure, wherein said first clip is attached to said first leg between said proximal end and said distal end, and wherein said second leg comprises a proximal end and a distal end, said proximal end of said second leg being attached to said body of said auxiliary mounting structure, wherein said second clip is attached to said second leg between said proximal end and said distal end.

4. The mounting bracket as recited in claim 1 wherein said first clip comprises a first connection arm, said first clip being attached to said first leg by said first connection arm, and wherein said second clip comprises a second connection arm, said second clip being attached to said second leg by said second connection arm.

5. The mounting bracket as recited in claim 4 wherein said first connection arm and said second connection arm are at least partially flexible.

6. The mounting bracket as recited in claim 1 wherein said first clip comprises a first extension disposed at a proximal end of said attachment arm, and wherein said second clip comprises a second extension disposed at a proximal end of said second arm.

7. The mounting bracket as recited in claim 6 wherein said first clip and said second clip are structured to at least partially move in opposing inward directions when a force is applied to said first extension and said second extension.

8. The mounting bracket as recited in claim 6 wherein said first clip and said second clip are structured to at least partially move in opposing inward directions when an inward force is applied to an end of said first extension and an end of said second extension.

9. The mounting bracket as recited in claim 1 wherein said first clip comprises a first shoulder extending between said first attachment arm and said first flange defining a first channel, and wherein said second clip comprises a second shoulder between said second attachment arm and said second flange defining a second channel.

10. The mounting bracket as recited in claim 9 wherein said first flange is at least partially movable in a direction away from said first attachment arm to at least partially expand said first channel, and wherein said second flange is at least partially movable in a direction away from said second attachment arm to at least partially expand said second channel.

\* \* \* \* \*